United States Patent
Jang et al.

(10) Patent No.: US 9,430,648 B2
(45) Date of Patent: Aug. 30, 2016

(54) METHOD AND APPARATUS FOR NEAR FIELD COMMUNICATION

(71) Applicant: Samsung Electronics Co., Ltd., Suwon-si (KR)

(72) Inventors: Won-Churl Jang, Seoul (KR); Jeong-Yeop Kim, Seoul (KR); Woon-Ki Lee, Goyang-si (KR)

(73) Assignee: Samsung Electronics Co., Ltd. (KR)

( * ) Notice: Subject to any disclaimer, the term of this patent is extended or adjusted under 35 U.S.C. 154(b) by 24 days.

(21) Appl. No.: 14/330,240

(22) Filed: Jul. 14, 2014

(65) Prior Publication Data

US 2015/0134970 A1     May 14, 2015

(30) Foreign Application Priority Data

Nov. 12, 2013   (KR) ........................ 10-2013-0136757

(51) Int. Cl.
| | |
|---|---|
| *H04L 9/32* | (2006.01) |
| *G06F 21/57* | (2013.01) |
| *H04W 4/00* | (2009.01) |
| *G06F 9/445* | (2006.01) |

(52) U.S. Cl.
CPC ............. *G06F 21/572* (2013.01); *G06F 8/665* (2013.01); *H04L 9/3247* (2013.01); *H04W 4/008* (2013.01); *H04L 2209/805* (2013.01)

(58) Field of Classification Search
CPC ........ G06F 21/57; G06F 21/44; G06F 21/64; G06F 11/1433; G06F 21/445; G06F 8/65; H04L 9/3242
See application file for complete search history.

(56) References Cited

U.S. PATENT DOCUMENTS

| | | | |
|---|---|---|---|
| 7,480,907 B1 * | 1/2009 | Marolia | G06F 8/65 717/127 |
| 7,907,531 B2 | 3/2011 | Jha et al. | |
| 2008/0289038 A1 | 11/2008 | Kim et al. | |
| 2009/0282399 A1 * | 11/2009 | Kamrowski | G06F 8/68 717/174 |
| 2010/0169876 A1 * | 7/2010 | Mann | G06F 8/65 717/170 |
| 2011/0143661 A1 | 6/2011 | Hartwig et al. | |
| 2011/0239211 A1 | 9/2011 | Kim et al. | |
| 2012/0005480 A1 * | 1/2012 | Batke | G06F 21/572 713/175 |
| 2012/0102477 A1 | 4/2012 | Kim et al. | |
| 2013/0227540 A1 * | 8/2013 | Ruster | G06F 8/65 717/170 |
| 2014/0025878 A1 * | 1/2014 | Peng | G06F 8/665 711/104 |

FOREIGN PATENT DOCUMENTS

| | | |
|---|---|---|
| JP | 2005215796 | 8/2005 |
| KR | 2005083192 | 8/2005 |
| KR | 2012092912 | 8/2012 |
| KR | 1190314 | 10/2012 |
| KR | 1214155 | 12/2012 |
| KR | 1270317 | 5/2013 |
| KR | 2013058346 | 6/2013 |

* cited by examiner

*Primary Examiner* — Amir Mehrmanesh
*Assistant Examiner* — Quy Pham
(74) *Attorney, Agent, or Firm* — Onello & Mello, LLP

(57) ABSTRACT

A method of updating firmware of a near field communication (NFC) device includes copying metadata, which is included in a firmware image file, from an application processor to the NFC device. One of a certification success signal and a certification fail signal is provided from the NFC device to the application processor after the NFC device verifies an integrity of the metadata. Firmware data, which is included in the firmware image file, is copied from the application processor to the NFC device when the application processor receives the certification success signal from the NFC device.

16 Claims, 18 Drawing Sheets

METHOD AND APPARATUS FOR NEAR FIELD COMMUNICATION

CROSS-REFERENCE TO RELATED APPLICATION(S)

This application claims priority under 35 USC §119 from Korean Patent Application No. 10-2013-0136757, filed on Nov. 12, 2013 in the Korean Intellectual Property Office (KIPO), the contents of which are herein incorporated by reference in their entirety.

BACKGROUND

1. Technical Field

The present inventive concepts relate to updating firmware in a secure manner. In particular, the inventive concepts relate to updating firmware of a near field communication (NFC) device and a method of operating an electronic system including an NFC device.

2. Description of the Related Art

Near field communication (NFC) technology, (which is a type of wireless communication technology) is now extensively employed in mobile devices, for example as a semiconductor device (e.g. "chip"). Recently, NFC technology has been used for mobile payment thus increasing the importance of security for the NFC device.

Generally, the NFC device also includes device drivers embodied in firmware. When a mobile device, (which includes the NFC device), downloads new firmware, an application processor, (also included in the mobile device), provides (and thereby updates) the new firmware to the NFC device.

However, if the new firmware is falsified by a hacker and the firmware of the NFC device is updated with the falsified firmware, security related incidents, such as personal information leakage, may occur.

SUMMARY

The present inventive concepts provide for a method of securely updating a firmware of a near field communication (NFC) device and an electronic system for performing the same. The present inventive concepts are not limited thereto. Other inventive concepts are described herein, or will be apparent from the following description of embodiments.

In an aspect, a method of updating firmware of a near field communication (NFC) device, the method comprises copying metadata, which is included in a firmware image file, from an application processor to the NFC device. One of a certification success signal and a certification fail signal is provided from the NFC device to the application processor after the NFC device verifies an integrity of the metadata. Firmware data, which is included in the firmware image file, is copied from the application processor to the NFC device when the application processor receives the certification success signal from the NFC device.

In some embodiments the metadata includes meta-information for the firmware data and a digital signature for the meta-information.

In some embodiments providing one of the certification success signal and the certification fail signal from the NFC device to the application processor after the NFC device verifies the integrity of the metadata includes determining, by the NFC device, whether the meta-information is changed after the digital signature is generated based on the digital signature and a public key. The certification success signal is transmitted to the application processor when the meta-information is unchanged after the digital signature is generated. The certification fail signal is transmitted to the application processor when the meta-information is changed after the digital signature is generated In some embodiments, the firmware data is divided into a plurality of packets, and the metadata includes a plurality of cyclic redundancy check (CRC) values corresponding to the plurality of packets, respectively.

In some embodiments, providing the firmware data from the application processor to the NFC device when the application processor receives the certification success signal from the NFC device includes serially transmitting the plurality of packets from the application processor to the NFC device. Upon receiving at the NFC device, one packet among the plurality of packets from the application processor, whether the one packet is damaged is determined based on a CRC value corresponding to the one packet among the plurality of CRC values included in the metadata. The application processor requests to retransmit the one packet when the one packet is damaged. The one packet is stored in a firmware storage unit included in the NFC device when the one packet is undamaged.

In some embodiments, the metadata includes a hash function value of the firmware data.

In some embodiments, providing the firmware data from the application processor to the NFC device when the application processor receives the certification success signal from the NFC device includes transmitting the firmware data from the application processor to the NFC device. The NFC device compares a value, which is calculated by performing a hash function on the firmware data, with the hash function value included in the metadata. A fail signal is transmitted to the application processor when the calculated value is different from the hash function value. A success signal is transmitted to the application processor when the calculated value is equal to the hash function value.

In some embodiments providing the firmware data from the application processor to the NFC device when the application processor receives the certification success signal from the NFC device further includes retransmitting the firmware data from the application processor to the NFC device when the application processor receives the fail signal from the NFC device. The firmware image file is stored in a current firmware storage unit included in the application processor when the application processor receives the success signal from the NFC device.

In some embodiments, the firmware image file includes a data area, which includes the metadata and the firmware data, and a digital signature for the data area.

In some embodiments, providing the metadata from the application processor to the NFC device includes determining, by the application processor, whether the data area is changed after the digital signature is generated based on the digital signature and a public key. The metadata is transmitted from the application processor to the NFC device when the data area is unchanged after the digital signature is generated.

In some embodiments, the metadata includes a hardware version, which represents a version of a hardware on which a firmware corresponding to the firmware data operates, and a firmware version, which represents a version of the firmware data.

In some embodiments, providing the metadata from the application processor to the NFC device includes transmitting a version request signal from the application processor to the NFC device. A current hardware version and a current firmware version is transmitted from the NFC device to the application processor in response to the version request signal. The metadata is transmitted from the application processor to the NFC device when the hardware version included in the metadata is equal to the current hardware version received from the NFC device, and the firmware version included in the metadata is higher than the current firmware version received from the NFC device.

In some embodiments, the metadata includes meta-information for the firmware data and a digital signature for the meta-information, and the meta-information includes a hash function value for the firmware data.

In some embodiments providing one of the certification success signal and the certification fail signal from the NFC device to the application processor after the NFC device verifies the integrity of the metadata includes determining, by the NFC device, whether the meta-information is changed after the digital signature is generated based on the digital signature and a public key. The certification success signal is transmitted to the application processor when the meta-information is unchanged after the digital signature is generated. The certification fail signal is transmitted to the application processor when the meta-information is changed after the digital signature is generated. Providing the firmware data from the application processor to the NFC device when the application processor receives the certification success signal from the NFC device includes transmitting the firmware data from the application processor to the NFC device. The NFC device compares a calculated value, which is generated by performing a hash function on the firmware data, with the hash function value included in the meta-information. A fail signal is transmitted to the application processor when the calculated value is different from the hash function value. A success signal is transmitted to the application processor when the calculated value is equal to the hash function value, In an aspect, a method of operating an electronic system including an application processor, a near field communication (NFC) device and a communication unit comprises downloading a firmware image file, which includes firmware data and metadata for the firmware data, using the communication unit. The firmware image file is stored in a new firmware storage unit included in the application processor. The metadata is copied from the application processor to the NFC device. One of a certification success signal and a certification fail signal is provided from the NFC device to the application processor after the NFC device verifies an integrity of the metadata. The firmware data is copied from the application processor to the NFC device when the application processor receives the certification success signal from the NFC device. The firmware image file is stored in a current firmware storage unit included in the application processor.

In an aspect, a near field communication (NFC) system comprises an application processor (AP), including a new firmware storage unit (NFSU) and a current firmware storage unit (CFSU). The AP is configured to receive a firmware image file (FIF) into the NFSU. The FIF comprises a meta-data and a firmware-data. The AP is configured to copy the FIF from the NFSU to the CFSU upon validation of an attribute of the meta-data. An NFC device is in electrical communication with the AP. The NFC device includes a firmware storage unit. The NFC device is configured to receive the meta-data from the AP into the firmware storage unit, to determine the validation of the attribute of the meta-data, and to transmit a signal to the AP to indicate if a validation of the meta-data has occurred.

In some embodiments, the AP is configured to transmit the firmware-data to the NFC device upon validation of an attribute of the meta-data.

In some embodiments, the AP is configured to transmit the firmware-data to the NFC device as a series of packets.

In some embodiments, the meta-data includes a digital signature used to validate the attribute of the meta-data.

In some embodiments, the meta-data includes a hash function value used to validate the attribute of the meta-data.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Figure 1:
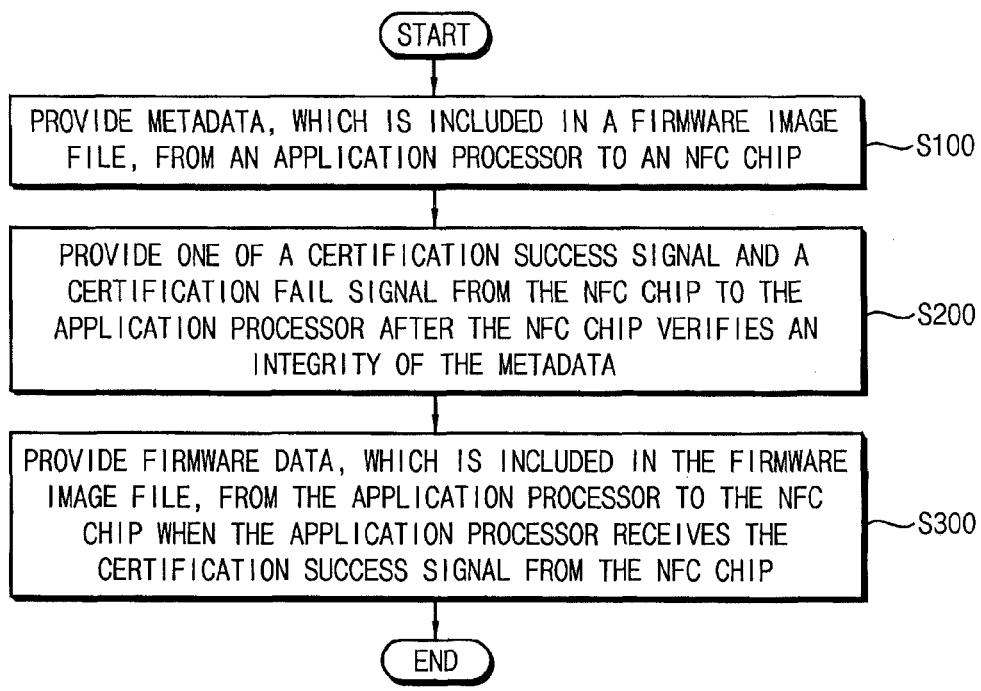
FIG. 1 is a flow chart illustrating a method of updating firmware of a near field communication (NFC) device.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of updating the firmware of a near field communication (NFC) device in an electronic system, which includes an application processor and the NFC device, according to example embodiments. In certain embodiments, the NFC device is a semiconductor device, however other embodiments are envisioned, including but not limited to printed circuit boards or multi-chip modules.

When the electronic system downloads a firmware image file, (which includes firmware data and metadata for the firmware data), the electronic system stores the firmware image file in the application processor. In certain embodiments, the firmware data is downloaded over a wired communication, while in other embodiments, a wireless communication is used. The application processor and the NFC device update the firmware of the NFC device using the firmware image file according to the method of shown in FIG. 1.

Referring to FIG. 1, the application processor provides the metadata, which is included in the firmware image file, to the NFC device (step S100). The NFC device verifies an integrity of the metadata, and then provides a certification success signal to the application processor when the NFC device determines that the metadata has an integrity (step S200). Conversely, the NFC device provides a certification fail signal to the application processor when the NFC device determines that the metadata does not have an integrity (step S200). For example, the NFC device may determine whether the metadata is falsified or changed by an attack of a hacker or other errors and provide either the certification success signal or the certification fail signal to the application processor based on the determination.

When the application processor receives the certification success signal from the NFC device, the application processor provides the firmware data, which is included in the firmware image file, to the NFC device The NFC device subsequently updates the firmware of the NFC device with the firmware data received from the application processor (step S300).

When the application processor receives the certification fail signal from the NFC device, the application processor terminates a firmware update operation without providing the firmware data, which is included in the firmware image file, to the NFC device. Therefore, the firmware of the NFC device may not be updated.

As described above, the application processor provides the metadata to the NFC device before providing the firmware data, (which corresponds to a raw data of a firmware), to the NFC device. The NFC device verifies an integrity of the metadata, and provides the certification success signal to the application processor when the NFC device determines that the metadata has an integrity. The application processor provides the firmware data to the NFC device to update the firmware of the NFC device with the firmware data when the application processor receives the certification success signal from the NFC device.

Therefore, the method of updating the firmware of the NFC device according to example embodiments may effectively prevent the firmware of the NFC device from being updated with a falsified firmware, which is changed by an attack of a hacker or other errors.

Figure 2:
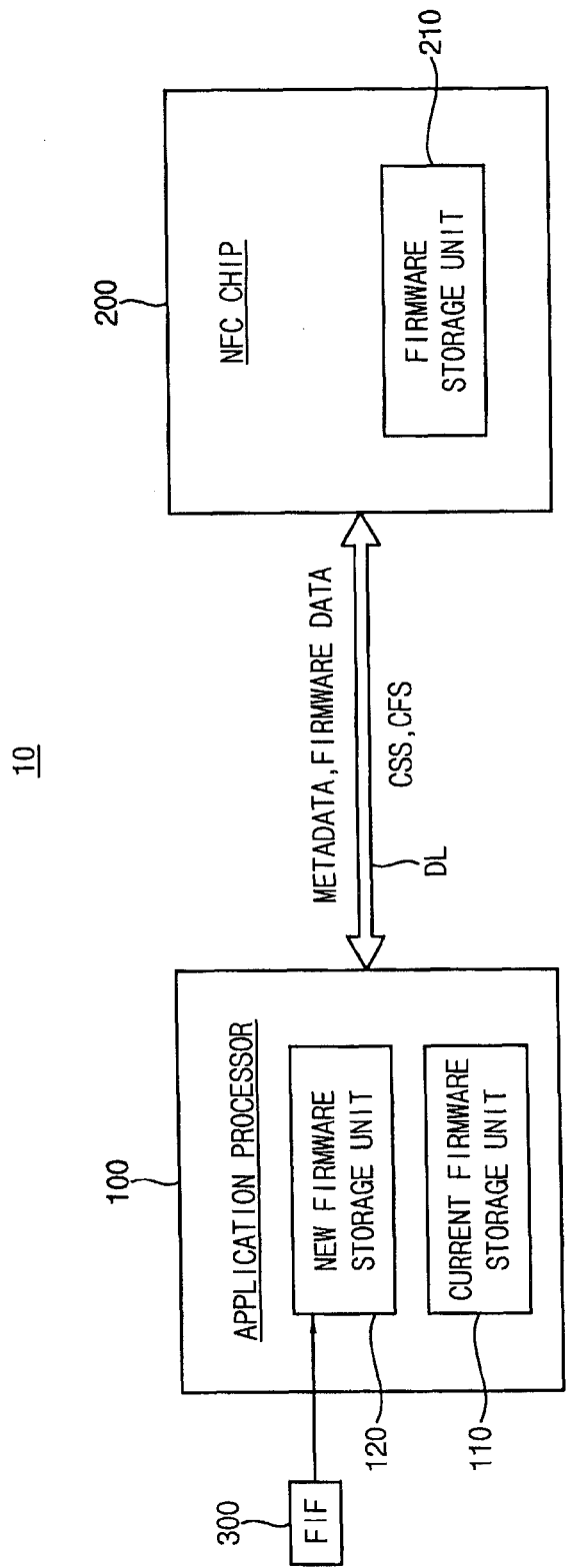
FIG. 2 is a block diagram illustrating an electronic system according to an embodiment of the inventive concepts.

FIG. 2 is a block diagram illustrating an electronic system according to example embodiments.

Referring to FIG. 2, an electronic system 10 includes an application processor 100 and an NFC device 200.

The application processor 100 and the NFC device 200 are coupled to each other through a data line (DL).

In some example embodiments, the application processor 100 and the NFC device 200 may perform a serial communication through the data line DL.

For example, the application processor 100 and the NFC device 200 may perform a serial communication using the universal asynchronous receiver/transmitter (UART) protocol through the data line DL to transceive data. In another example, the application processor 100 and the NFC device 200 may perform a communication using the inter-integrated circuit (I2C) protocol through the data line DL to transceive data.

The NFC device 200 includes a firmware storage unit 210. The firmware storage unit 210 stores firmware for driving the NFC device 200.

The application processor 100 includes a current firmware storage unit 110 and a new firmware storage unit 120. When the application processor 100 receives a firmware image file (FIF) 300, the application processor 100 stores the FIF 300 in the new firmware storage unit 120.

Figure 3:
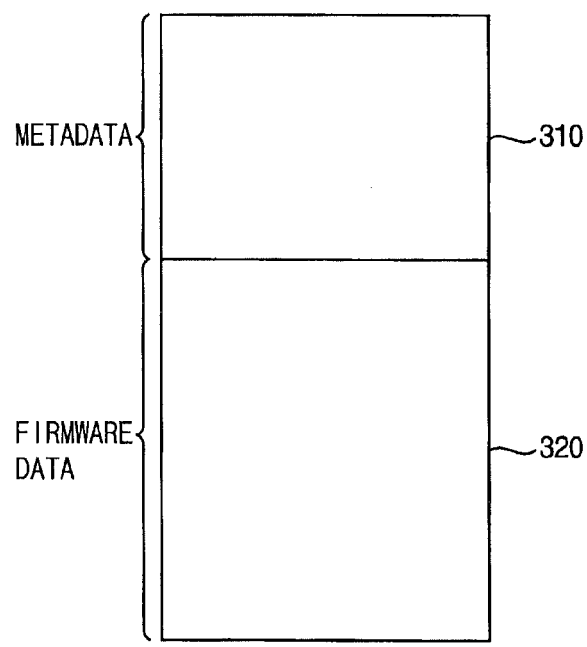
FIG. 3 is a diagram illustrating a structure of a firmware image file used in the electronic system of FIG. 2.

FIG. 3 is a diagram illustrating a structure of the firmware image file used in the electronic system of FIG. 2.

Referring to FIG. 3, the firmware image file 300 may include firmware data 320, which corresponds to a raw data of the firmware for driving the NFC device 200, and metadata 310 for the firmware data 320.

In one example embodiment, the firmware image file 300 is generated by a manufacturer of the NFC device 200 and is provided to the electronic system 10.

Referring to FIG. 2 and FIG. 3, the application processor 100 provides the metadata 310 included in the firmware image file 300 to the NFC device 200. The NFC device 200 verifies an integrity of the metadata 310, and then provides either a certification success signal (CSS) or a certification fail signal (CFS) to the application processor 100 based on a result of the verification. The application processor 100 provides the firmware data 320 to the NFC device 200 when the application processor 100 receives the certification success signal CSS from the NFC device 200. The NFC device 200 subsequently updates the firmware of the NFC device 200 with the firmware data 320 provided from the application processor 100 by storing the firmware data 320 in the firmware storage unit 210.

The method of updating the firmware as shown in FIG. 1 may be performed by the electronic system 10 of FIG. 2.

Hereinafter, the method of updating the firmware of FIG. 1 will be described in detail with reference to FIG. 2.

The application processor 100 may provide the metadata 310 included in the firmware image file 300, (which is stored in the new firmware storage unit 120), to the NFC device 200 through the data line DL (step S100).

The NFC device 200 may verify the integrity of the metadata 310, and then provide the certification success signal (CSS) to the application processor 100 through the data line DL when the NFC device 200 determines that the metadata 310 has an integrity. Conversely, the NFC device 200 may provide the certification fail signal (CFS) to the application processor 100 through the data line DL when the NFC device 200 determines that the metadata 310 does not have an integrity (step S200).

Figure 4:
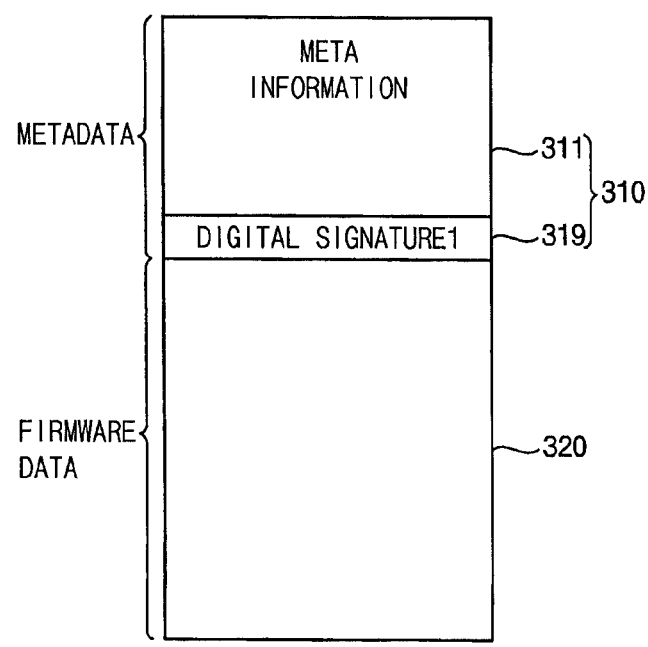
FIG. 4 is a diagram illustrating an example of a structure of the firmware image file of FIG. 3.
Figure 5:
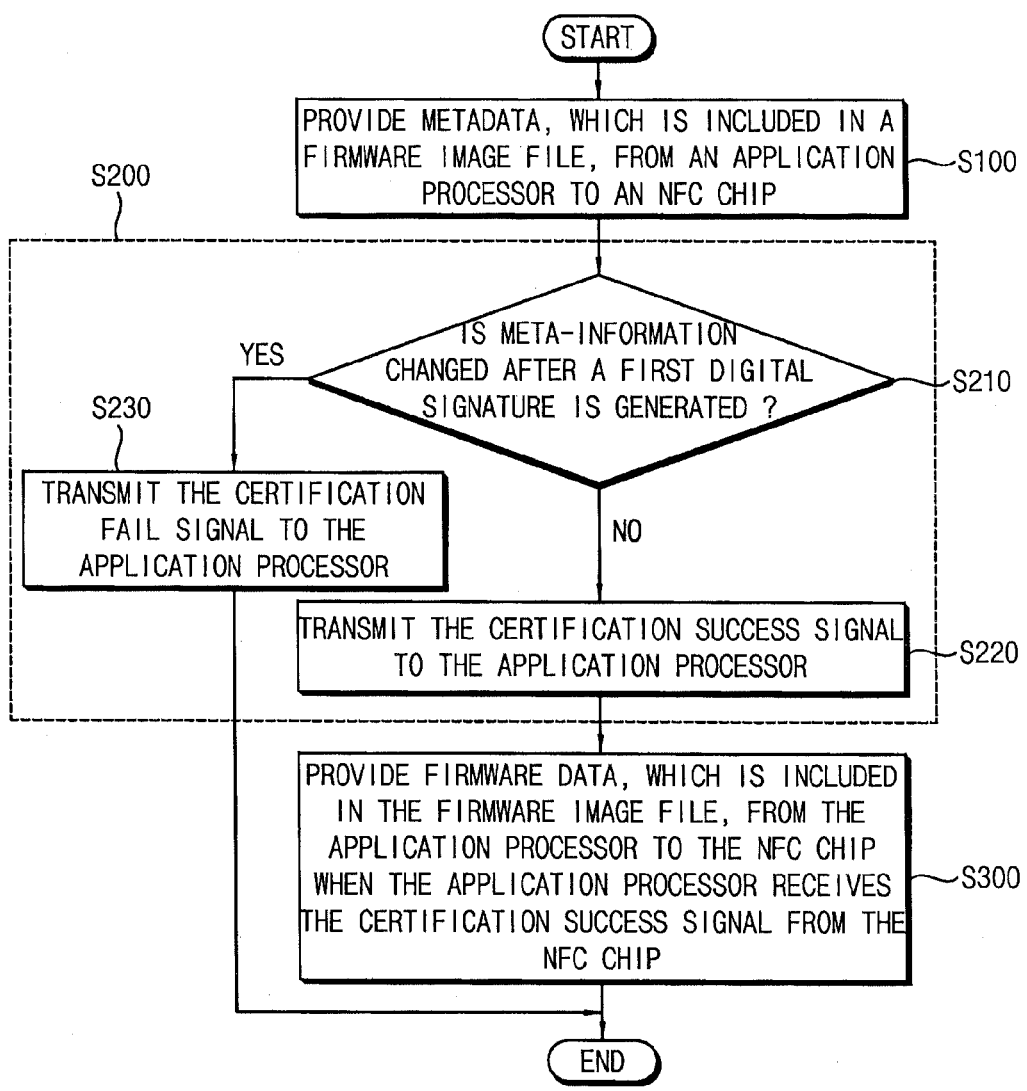
FIG. 5 is a flow chart illustrating an example of providing a certification signal from the NFC device to the application processor wherein the firmware image file has a structure of FIG. 4.

FIG. 4 is a diagram illustrating an example of a structure of a firmware image file of FIG. 3. FIG. 5 is a flow chart illustrating an example of providing either a CSS or a CFS from the NFC device to the application processor after the NFC device verifies an integrity of metadata (step S200) shown in FIG. 1, and when the firmware image file has the structure of FIG. 4.

Referring to FIG. 4, a firmware image file 300a may include the firmware data 320 and the metadata 310 for the firmware data 320.

The metadata 310 may include meta-information 311, which includes information of the firmware data 320, and a first digital signature 319 for the meta-information 311. The first digital signature 319 may be generated by applying one or more various encryption algorithms to the meta-information 311. In one example, an encryption algorithm based on a Pretty Good Privacy (PGP) key is used.

A first public key to decrypt the first digital signature 319 may be stored in the NFC device 200. In some example embodiments, the first public key may be stored in the NFC device 200 when the NFC device 200 is manufactured. In other example embodiments, the first public key may be downloaded and stored in the application processor 100. The application processor 100 subsequently may provide the first public key to the NFC device 200 to store the first public key in the NFC device 200.

In this case, the NFC device 200 may verify the integrity of the metadata 310 using the first digital signature 319.

With reference to FIG. 5 showing an example embodiment, the NFC device 200 receives the metadata 310 from the application processor 100 (step S100), and then determines whether the meta-information 311 has changed after the first digital signature 319 is generated, based on the first digital signature 319 and the first public key (step S210).

For example, the NFC device 200 may decrypt the first digital signature 319 using the first public key to generate a first decryption data, and compare the first decryption data with the meta-information 311 to determine whether the meta-information 311 is changed after the first digital signature 319 is generated.

When the NFC device 200 determines that the meta-information 311 is unchanged after the first digital signature 319 is generated (e.g. the "no" branch at step S210), the NFC device 200 may transmit the CSS to the application processor 100 through the data line DL (step S220).

Conversely, when the NFC device 200 determines that the meta-information 311 is changed after the first digital signature 319 is generated (e.g the "yes" branch at step S210), the NFC device 200 may transmit the CFS to the application processor 100 through the data line DL (step S230).

When the application processor 100 receives the CFS from the NFC device 200, the application processor 100 may terminate a firmware update operation without providing the firmware data 320, (which is included in the firmware image file 300a that is stored in the new firmware storage unit 120), to the NFC device 200.

Conversely, when the application processor 100 receives the CSS from the NFC device 200, the application processor 100 may transmit the firmware data 320, to the NFC device 200. Subsequently, the NFC device 200 may update the firmware of the NFC device 200 with the firmware data 320 by storing the firmware data 320 in the firmware storage unit 210 (step S300).

In some example embodiments, the meta-information 311 may include an error check value for the firmware data 320.

In this case, the NFC device 200 may determine whether the firmware data 320 received from the application processor 100 is damaged (e.g. corrupted) based on the error check value included in the meta-information 311. When the NFC device 200 determines that the firmware data 320 is damaged, the NFC device 200 may request the application processor 100 to retransmit the firmware data 320. Conversely, when the NFC device 200 determines that the firmware data 320 is undamaged, the NFC device 200 may update the firmware of the NFC device 200 with the firmware data 320.

As described above, when the NFC device 200 receives the metadata 310 from the application processor 100, the NFC device 200 may verify an integrity of the meta-information 311, which includes the error check value, based on the first digital signature 319. Subsequently, when the NFC device 200 receives the firmware data 320 from the application processor 100, the NFC device 200 may determine whether the firmware data 320 is damaged based on the error check value. Thus in one non-limiting example, the electronic system 10 may detect whether the firmware image file 300 is falsified by an attack of a hacker despite the hacker falsifying the firmware data 320 together with the error check value included in the meta-information 311. In addition, the electronic system 10 may effectively detect a hacker attack on the firmware data 320, which is transmitted between the application processor 100 and the NFC device 200, or alternatively, the electronic system 10 may detect a transmission error.

In some example embodiments, the error check value may include a cyclic redundancy check (CRC) value for the firmware data 320.

In other example embodiments, the error check value may include a hash function value for the firmware data 320.

Figure 6:
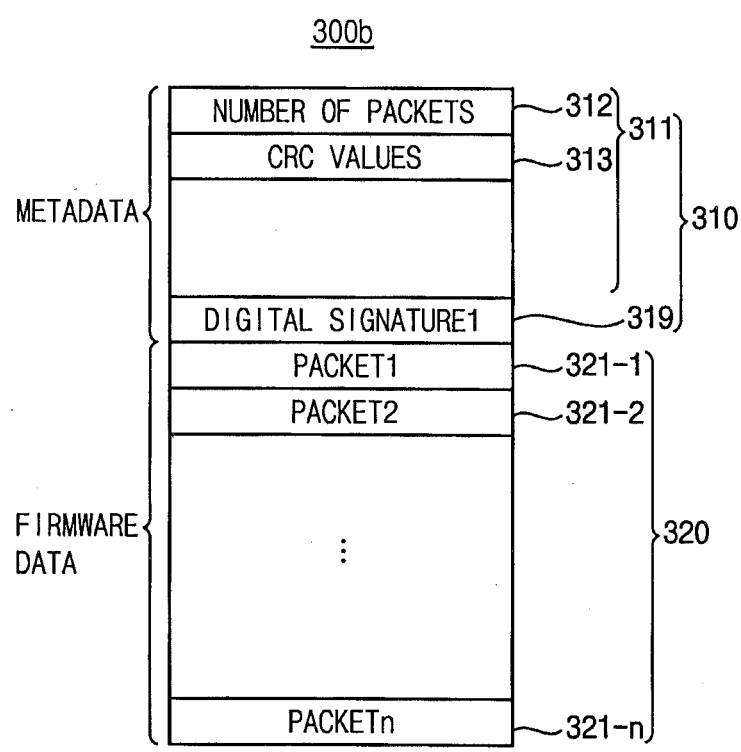
FIG. 6 is a diagram illustrating an example of a structure of the firmware image file of FIG. 3.
Figure 7:
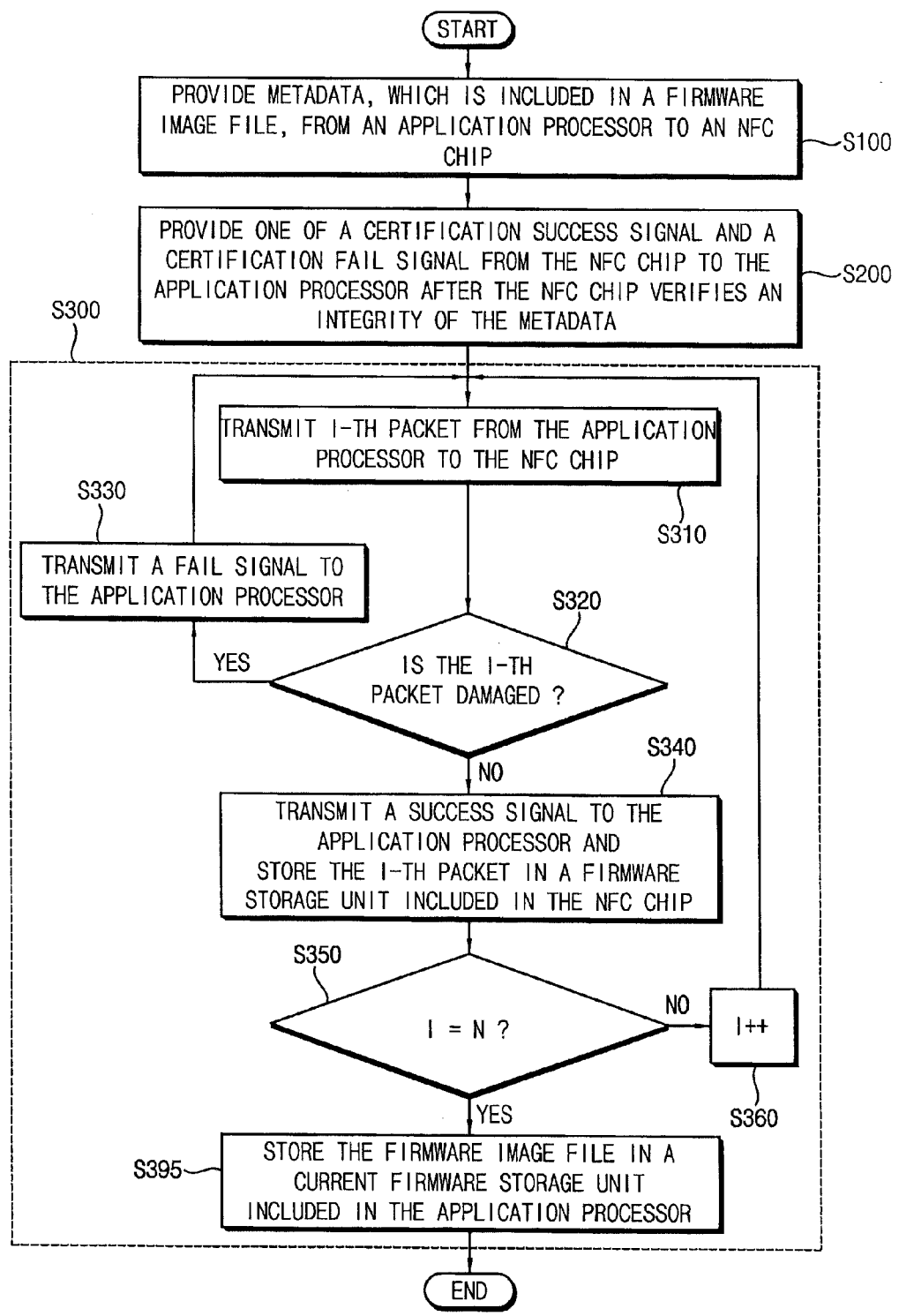
FIG. 7 is a flow chart illustrating an example of providing firmware data from the application processor to the NFC device wherein the firmware image file has the structure of FIG. 6.

FIG. 6 is a diagram illustrating an example of the structure of the firmware image file of FIG. 3. FIG. 7 is a flow chart illustrating an example of providing firmware data from the application processor to an NFC device when the application processor receives a CSS from the NFC device (step S300 of FIG. 1) and where the firmware image file has the structure shown in FIG. 6.

Referring to FIG. 6, a firmware image file 300b may include the firmware data 320 and the metadata 310 for the firmware data 320.

The firmware data 320 may be divided into a plurality of packets 321-1, 321-2, through 321-n, where "n" represents an integer equal to or greater than two.

As described above with reference to FIG. 4, the metadata 310 may include the meta-information 311, which includes information of the firmware data 320, and the first digital signature 319 for the meta-information 311. The first digital signature 319 may be generated by applying one or more various encryption algorithms to the meta-information 311.

The meta-information 311 may include a number 312 of the plurality of packets 321-1, 321-2 through 321-n included in the firmware data 320 and a plurality of CRC values 313 corresponding to the plurality of packets 321-1, 321-2 through 321-n, respectively. For example, each packet would have a CRC value associated with it.

In this case, the NFC device 200 may determine whether the firmware data 320 received from the application processor 100 is damaged based on the plurality of CRC values 313 included in the meta-information 311.

In some example embodiments, when the application processor 100 receives the CSS from the NFC device 200, the application processor 100 may transmit the plurality of packets 321-1, 321-2 through 321-n to the NFC device 200, with each packet transmitted serially. Whenever the NFC device 200 receives one packet among the plurality of packets 321-1, 321-2 through 321-n from the application processor 100, the NFC device 200 may determine whether a particular single packet is damaged based on a CRC value corresponding to the single packet. When the NFC device 200 determines that the one packet is damaged, the NFC device 200 may request the application processor 100 to retransmit the one packet. Conversely, when the NFC device 200 determines that the one packet is undamaged, the NFC device 200 may store the one packet in the firmware storage unit 210 included in the NFC device 200.

For example, as illustrated in FIG. 7, when the application processor 100 receives the CSS from the NFC device 200, the application processor 100 may transmit a first packet 321-1 to the NFC device 200 (step S310). The NFC device 200 may determine whether the first packet 321-1 is damaged based on a CRC value corresponding to the first packet 321-1 among the plurality of CRC values 313 included in the meta-information 311 (step S320).

When the first packet 321-1 is damaged (e.g. branch "yes" at step S320), the NFC device 200 may transmit a fail signal to the application processor 100 (step S330). When the application processor 100 receives the fail signal from the NFC device 200, the application processor 100 may retransmit the first packet 321-1 to the NFC device 200 (step S310).

When the first packet 321-1 is undamaged (e.g. branch "no" at step S320), the NFC device 200 may transmit a success signal to the application processor 100 and store the first packet 321-1 in the firmware storage unit 210 included in the NFC device 200 (step S340).

When the application processor 100 receives the success signal from the NFC device 200, the application processor 100 may determine whether all of the plurality of packets 321-1, 321-2 through 321-n are transmitted to the NFC device 200 (step S350). For example, the application processor 100 may determine that all of the plurality of packets 321-1, 321-2 through 321-n are transmitted to the NFC device 200 when a number of packets transmitted to the NFC device 200 is equal to the number 312 of the plurality of packets 321-1, 321-2 through 321-n included in the meta-information 311.

When all of the plurality of packets 321-1, 321-2 through 321-n are not transmitted to the NFC device 200 (e.g. branch "no" at step S350), the application processor 100 may select a next packet, which is a second packet 321-2 in this case, (step S360) and transmit the second packet 321-2 to the NFC device 200 (step S310).

The application processor 100 and the NFC device 200 may repeat the operations (steps S310, S320, S330, S340, S350 and S360) described above until all of the plurality of packets 321-1, 321-2 through 321-n included in the firmware data 320 are transmitted to the NFC device 200.

When all of the plurality of packets 321-1, 321-2 through 321-n are transmitted to the NFC device 200 such that the NFC device 200 has stored all of the plurality of packets 321-1, 321-2 through 321-n in the firmware storage unit 210 (e.g. branch "yes" at step S350), the application processor 100 may store the firmware image file 300b, which is stored in the new firmware storage unit 120, in the current firmware storage unit 110 to finish the firmware update operation (step S395). Therefore, the current firmware storage unit 110 included in the application processor 100 may store the firmware image file 300b corresponding to the firmware data 320 stored in the firmware storage unit 210 included in the NFC device 200.

As described above with reference to FIGS. 6 and 7, the NFC device 200 may verify whether the firmware data 320 provided from the application processor 100 is damaged based on the plurality of CRC values 313 included in the meta-information 311. Therefore, the electronic system 10 may effectively prevent the firmware of the NFC device 200 from being updated with a falsified firmware, which is changed by an attack of a hacker or other errors.

Figure 8:
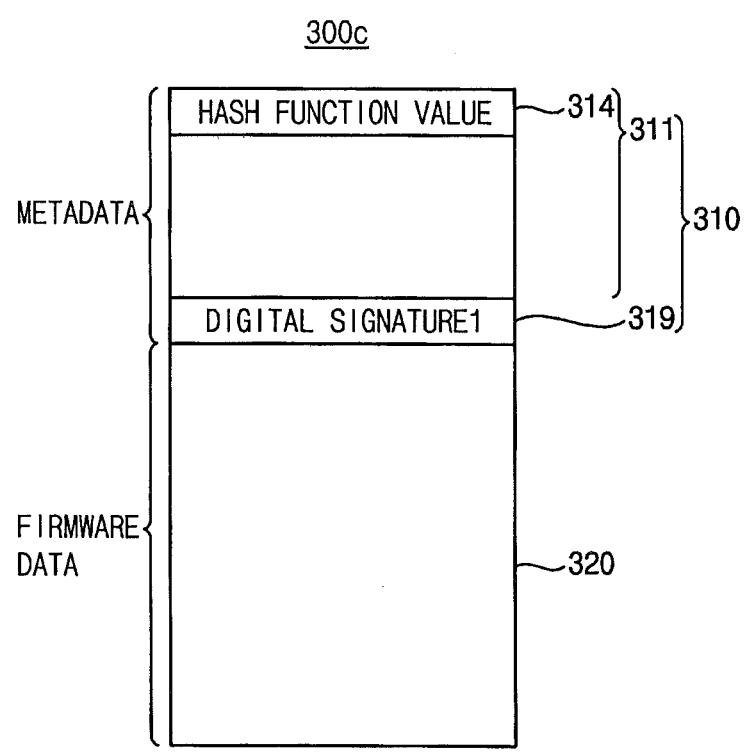
FIG. 8 is a diagram illustrating an example of a structure of the firmware image file of FIG. 3.
Figure 9:
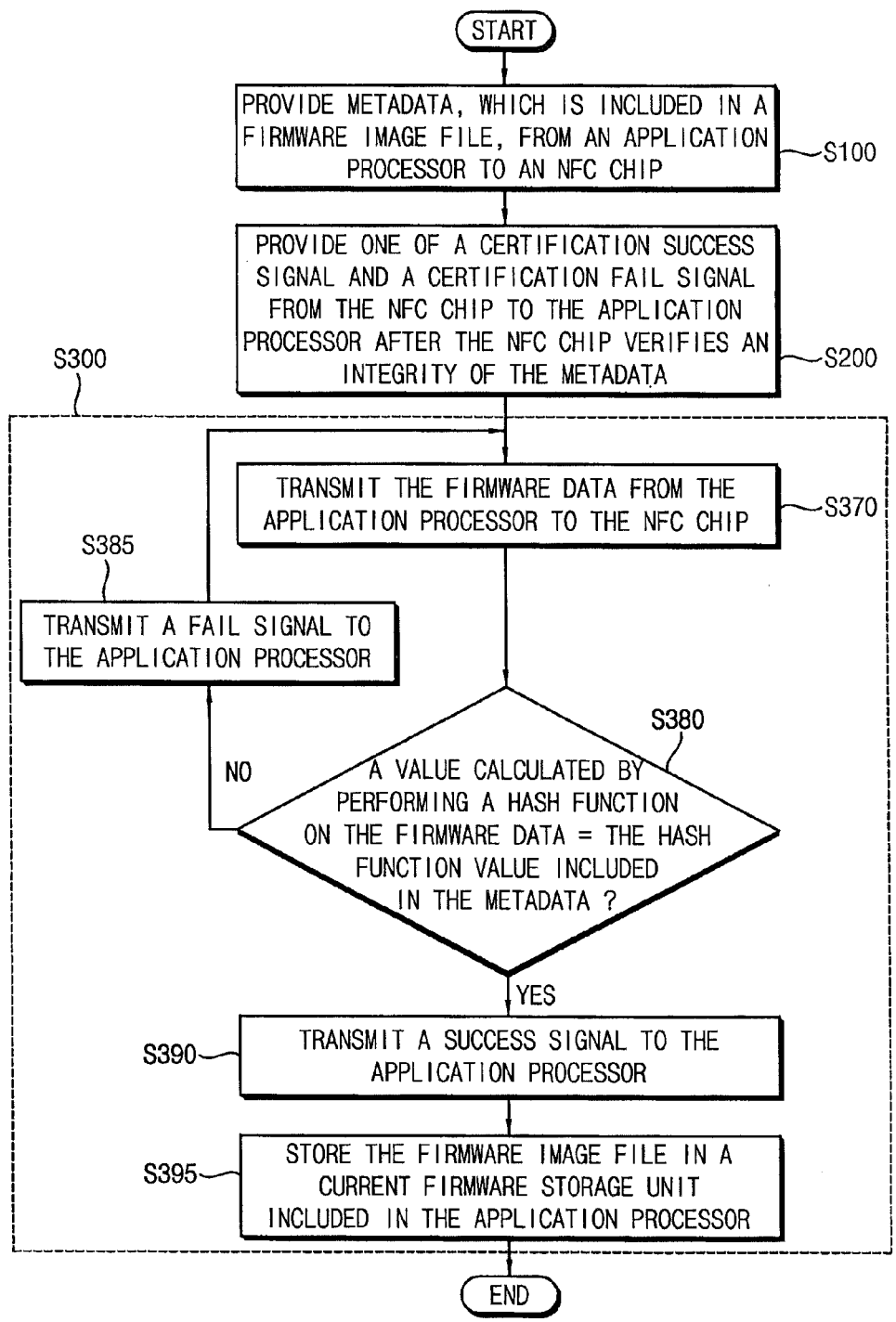
FIG. 9 is a flow chart illustrating an example of providing firmware data from the application processor to the NFC device wherein the firmware image file has the structure of FIG. 6.

FIG. 8 is a diagram illustrating an example of the structure of the firmware image file of FIG. 3. FIG. 9 is a flow chart illustrating an example of providing firmware data from the application processor to the NFC device when the application processor receives a CSS from the NFC device (step S300 of FIG. 1) and when a firmware image file has the structure of FIG. 8.

Referring to FIG. 8, a firmware image file 300c may include the firmware data 320 and the metadata 310 for the firmware data 320.

As described above with reference to FIG. 4, the metadata 310 may include the meta-information 311, which includes information of the firmware data 320, and the first digital signature 319 for the meta-information 311. The first digital signature 319 may be generated by applying one or more various encryption algorithms to the meta-information 311.

The meta-information 311 may include a hash function value 314 of the firmware data 320.

In this case, the NFC device 200 may determine whether the firmware data 320 received from the application processor 100 is damaged based on the hash function value 314 included in the meta-information 311.

In some example embodiments, as illustrated in FIG. 9, when the application processor 100 receives the CSS from the NFC device 200, the application processor 100 may transmit the firmware data 320 to the NFC device 200 (step S370). The NFC device 200 may store the firmware data 320 provided from the application processor 100 in the firmware storage unit 210.

The NFC device 200 may determine whether the firmware data 320 is damaged by comparing a value, which is calculated by performing a hash function on the firmware data 320 received from the application processor 100, with the hash function value 314 included in the meta-information 311 (step S380).

When the calculated value is different from the hash function value 314 (step S380; no), the NFC device 200 may transmit a fail signal to the application processor 100 (step S385) since the firmware data 320 is damaged. When the application processor 100 receives the fail signal from the NFC device 200, the application processor 100 may retransmit the firmware data 320 to the NFC device 200 (step S370).

When the calculated value is equal to the hash function value 314 (e.g. branch "yes" at step S380), the NFC device 200 may transmit a success signal to the application processor 100 (step S390) since the firmware data 320 is undamaged.

When the application processor 100 receives the CSS from the NFC device 200, the application processor 100 may store the firmware image file 300c, (which is stored in the new firmware storage unit 120), in the current firmware storage unit 110 to finish the firmware update operation (step S395). Therefore, the current firmware storage unit 110 included in the application processor 100 may store the firmware image file 300c corresponding to the firmware data 320 stored in the firmware storage unit 210 included in the NFC device 200.

As described above with reference to FIG. 8 and FIG. 9, the NFC device 200 may verify whether the firmware data 320 provided from the application processor 100 is damaged based on the hash function value 314 included in the meta-information 311. Therefore, the electronic system 10 may effectively prevent the firmware of the NFC device 200 from being updated with a falsified firmware, which is changed by an attack of a hacker or other errors.

Figure 10:
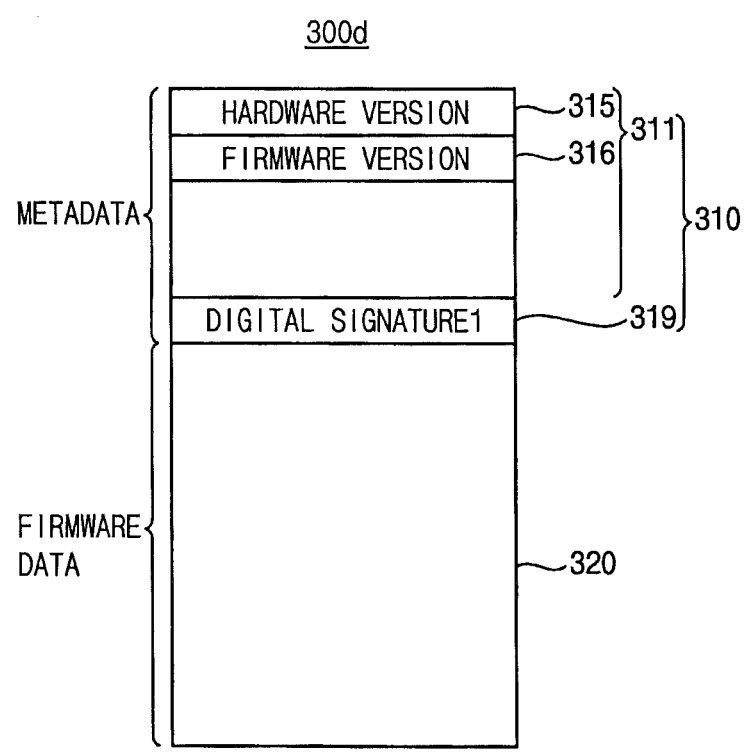
FIG. 10 is a diagram illustrating an example of a structure of the firmware image file of FIG. 3.
Figure 11:
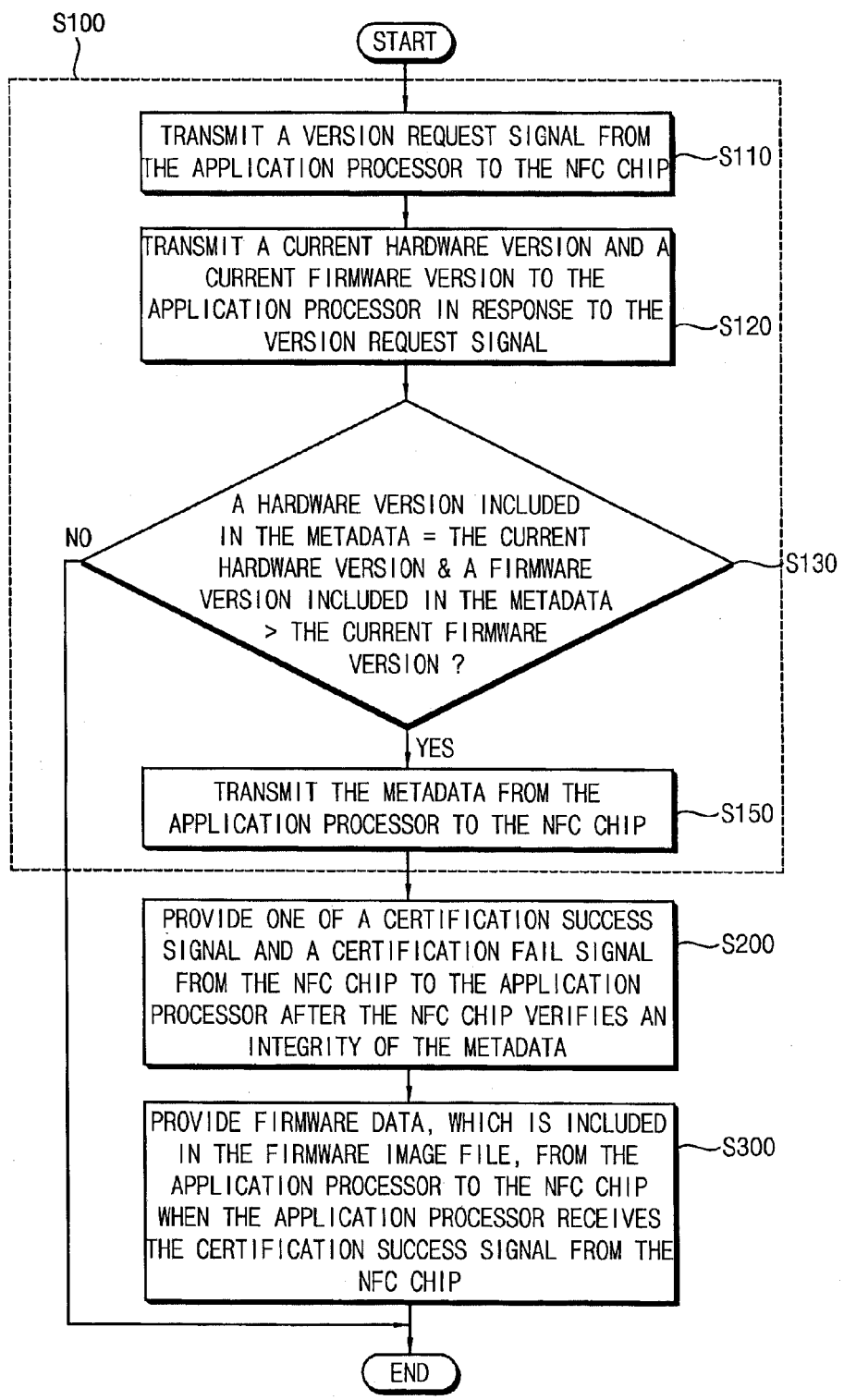
FIG. 11 is a flow chart illustrating an example of providing metadata from an application processor to an NFC device of FIG. 1 wherein the firmware image file has the structure of FIG. 10.

FIG. 10 is a diagram illustrating an example of the structure of the firmware image file of FIG. 3. FIG. 11 is a flow chart illustrating an example of providing metadata from the application processor to the NFC device (step S100) of FIG. 1, and where the firmware image file has the structure of FIG. 10.

Referring to FIG. 10, a firmware image file 300d may include the firmware data 320 and the metadata 310 for the firmware data 320.

As described above with reference to FIG. 4, the metadata 310 may include the meta-information 311, which includes information of the firmware data 320, and the first digital signature 319 for the meta-information 311. The first digital signature 319 may be generated by applying one or more various encryption algorithms to the meta-information 311.

The meta-information 311 may include a hardware version 315, which represents a version of a hardware on which a firmware corresponding to the firmware data 320 operates, and a firmware version 316, which represents a version of the firmware data 320.

In this case, the application processor 100 may determine whether the firmware of the NFC device 200 is required to be updated with the firmware data 320 included in the firmware image file 300d based on the hardware version 315 and the firmware version 316 included in the meta-information 311.

In some example embodiments, as illustrated in FIG. 11, the application processor 100 may transmit a version request signal to the NFC device 200 (step S110) before transmitting the metadata 310 to the NFC device 200.

The NFC device 200 may transmit a current hardware version, which represents a hardware version of the NFC device 200, and a current firmware version, which represents a version of the firmware stored in the firmware storage unit 210 of the NFC device 200, to the application processor 100 in response to the version request signal (step S120). In some example embodiments, the current hardware version and the current firmware version may be stored in a register included in the NFC device 200.

The application processor 100 may determine whether the firmware of the NFC device 200 is required to be updated with the firmware data 320 by comparing the hardware version 315 included in the meta-information 311 with the current hardware version received from the NFC device 200 and comparing the firmware version 316 included in the meta-information 311 with the current firmware version received from the NFC device 200.

For example, when the hardware version 315 included in the meta-information 311 is different from the current hardware version received from the NFC device 200 or the firmware version 316 included in the meta-information 311 is equal to or lower than the current firmware version received from the NFC device 200 (e.g branch "no" at step S130), the application processor 100 may terminate the firmware update operation without providing the metadata 310, (which is included in the firmware image file 300d that is stored in the new firmware storage unit 120), to the NFC device 200.

Conversely, when the hardware version 315 included in the meta-information 311 is equal to the current hardware version received from the NFC device 200 and the firmware version 316 included in the meta-information 311 is higher than the current firmware version received from the NFC device 200 (e.g. branch "yes" at step S130), the application processor 100 may transmit the metadata 310, which is included in the firmware image file 300d that is stored in the new firmware storage unit 120, to the NFC device 200 through the data line DL (step S150).

In this case, the NFC device 200 may verify an integrity of the metadata 310, and then provide the CSS to the application processor 100 through the data line DL when the NFC device 200 determines that the metadata 310 has an integrity, or alternatively provide the CFS to the application processor 100 through the data line DL when the NFC device 200 determines that the metadata 310 does not have an integrity (step S200).

When the application processor 100 receives the CFS from the NFC device 200, the application processor 100 may terminate the firmware update operation without providing the firmware data 320, which is included in the firmware image file 300d that is stored in the new firmware storage unit 120, to the NFC device 200.

Conversely, when the application processor 100 receives the CSS from the NFC device 200, the application processor 100 may provide the firmware data 320, (which is included in the firmware image file 300d that is stored in the new firmware storage unit 120), to the NFC device 200 through the data line DL, and the NFC device 200 may update the firmware of the NFC device 200 with the firmware data 320 by storing the firmware data 320 in the firmware storage unit 210 (step S300).

Example embodiments for the NFC device 200 to verify an integrity of the metadata 310, and then to provide either the CSS or the CFS to the application processor 100 (step S200), and example embodiments for the application processor 100 to provide the firmware data 320 to the NFC device 200 when the application processor 100 receives the certification success signal CSS from the NFC device 200 (step S300), are described above with reference to FIG. 4 through FIG. 9.

Figure 12:
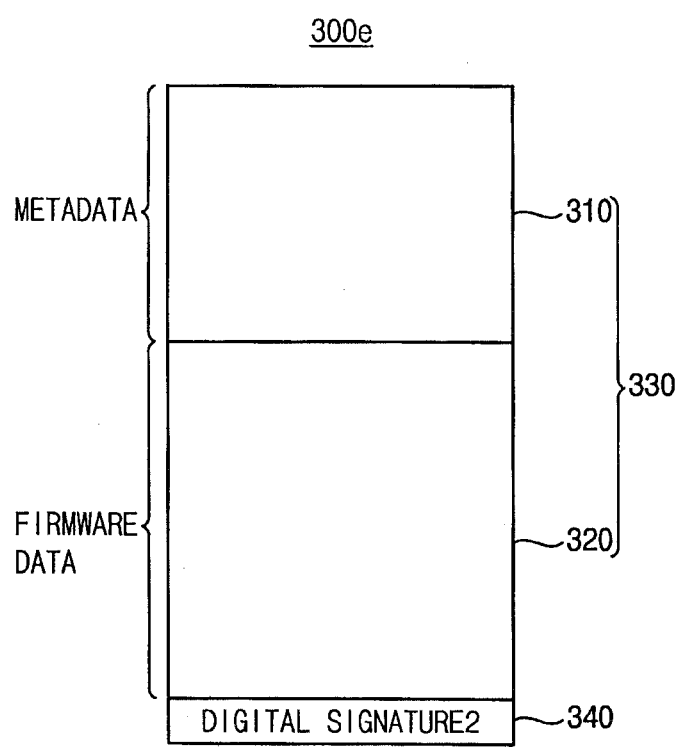
FIG. 12 is a diagram illustrating an example of a structure of the firmware image file of FIG. 3.
Figure 13:
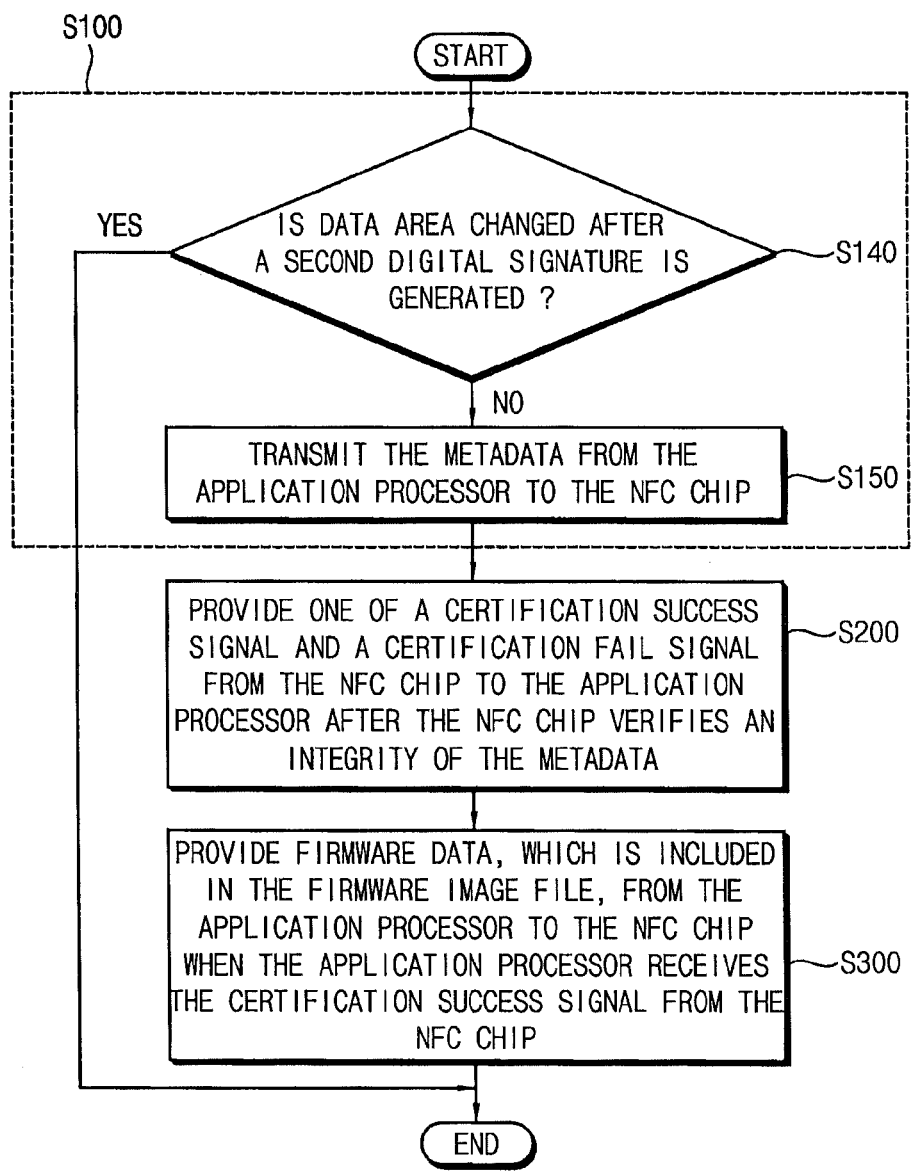
FIG. 13 is a flow chart illustrating an example of providing metadata from an application processor to the NFC device of FIG. 1 wherein the firmware image file has the structure of FIG. 12.

FIG. 12 is a diagram illustrating an example of the structure of the firmware image file of FIG. 3. FIG. 13 is a flow chart illustrating an example of providing metadata from an application processor to the NFC device, and where the firmware image file has the structure shown in FIG. 12.

Referring to FIG. 12, a firmware image file 300e may include a data area 330 and a second digital signature 340 for the data area 330.

The data area 330 may include the firmware data 320, which corresponds to a raw data of a firmware to drive the NFC device 200, and the metadata 310, which includes information of the firmware data 320.

The second digital signature 340 may be generated by applying one or more various encryption algorithms to the data area 330.

A second public key to decrypt the second digital signature 340 may be stored in the application processor 100. In some example embodiments, the second public key may be stored in the application processor 100 when the electronic system 10 is manufactured. In other example embodiments, the second public key may be downloaded and stored in the application processor 100. A non-limiting example of a public key is a PGP key, although other keys are envisioned within the scope of this disclosure.

In this case, the application processor 100 may verify the integrity of the firmware image file 300e using the second digital signature 340.

In some example embodiments, as illustrated in FIG. 13, when the application processor 100 receives the firmware image file 300e from a source external to the application processor 100, the application processor 100 may determine whether the data area 330 is changed after the second digital signature 340 is generated based on the second digital signature 340 and the second public key (step S140).

For example, the application processor 100 may decrypt the second digital signature 340 using the second public key to generate a second decryption data, and compare the second decryption data with the data area 330 to determine whether the data area 330 is changed after the second digital signature 340 is generated.

When the application processor 100 determines that the data area 330 is changed after the second digital signature 340 is generated (e.g. branch "yes" at step S140), the application processor 100 may terminate the firmware update operation without providing the metadata 310, (which is included in the firmware image file 300e that is stored in the new firmware storage unit 120), to the NFC device 200.

Conversely, when the application processor 100 determines that the data area 330 is unchanged after the second digital signature 340 is generated (e.g. branch "no" at step S140), the application processor 100 may transmit the metadata 310, (which is included in the firmware image file 300e that is stored in the new firmware storage unit 120), to the NFC device 200 through the data line DL (step S150).

In this case, the NFC device 200 may verify an integrity of the metadata 310, and then provide the CSS to the application processor 100 through the data line DL when the NFC device 200 determines that the metadata 310 has an integrity, or alternatively provide the CFS to the application processor 100 through the data line DL when the NFC device 200 determines that the metadata 310 does not have an integrity (step S200).

When the application processor 100 receives the CFS from the NFC device 200, the application processor 100 may terminate the firmware update operation without providing the firmware data 320, (which is included in the firmware image file 300e that is stored in the new firmware storage unit 120), to the NFC device 200.

Alternatively, when the application processor 100 receives the CSS from the NFC device 200, the application processor 100 may provide the firmware data 320, (which is included in the firmware image file 300e that is stored in the new firmware storage unit 120), to the NFC device 200 through the data line DL and the NFC device 200 may update the firmware of the NFC device 200 with the firmware data 320 by storing the firmware data 320 in the firmware storage unit 210 (step S300).

Example embodiments for the NFC device 200 to verify an integrity of the metadata 310, and then to provide either the CSS or the CFS to the application processor 100 (step S200) and example embodiments for the application processor 100 to provide the firmware data 320 to the NFC device 200 when the application processor 100 receives the certification success signal CSS from the NFC device 200 (step S300) are described above with reference to FIG. 4 through FIG. 9.

As described above with reference to FIG. 12 and FIG. 13, the application processor 100 may verify an integrity of the data area 330, which includes the firmware data 320 and the metadata 310, based on the second digital signature 340 included in the firmware image file 300e, and update the firmware of the NFC device 200 with the firmware data 320 when the data area 330 has an integrity. Therefore, the electronic system 10 may effectively prevent the firmware of the NFC device 200 from being updated with a falsified firmware, which is changed by an attack of a hacker or other errors.

Figure 14:
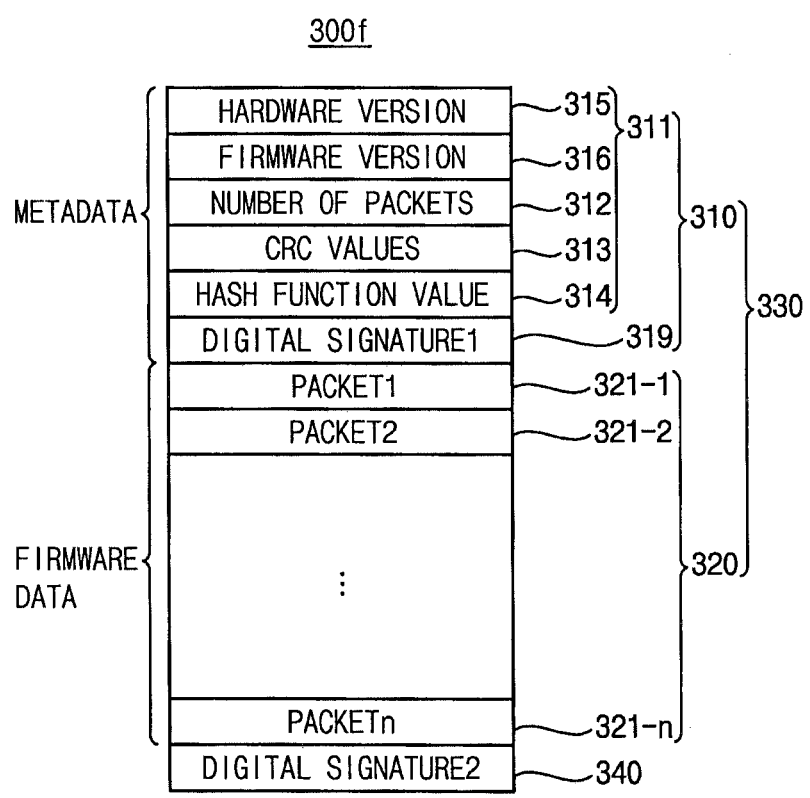
FIG. 14 is a diagram illustrating an example of a structure of the firmware image file of FIG. 3.
Figure 15A:
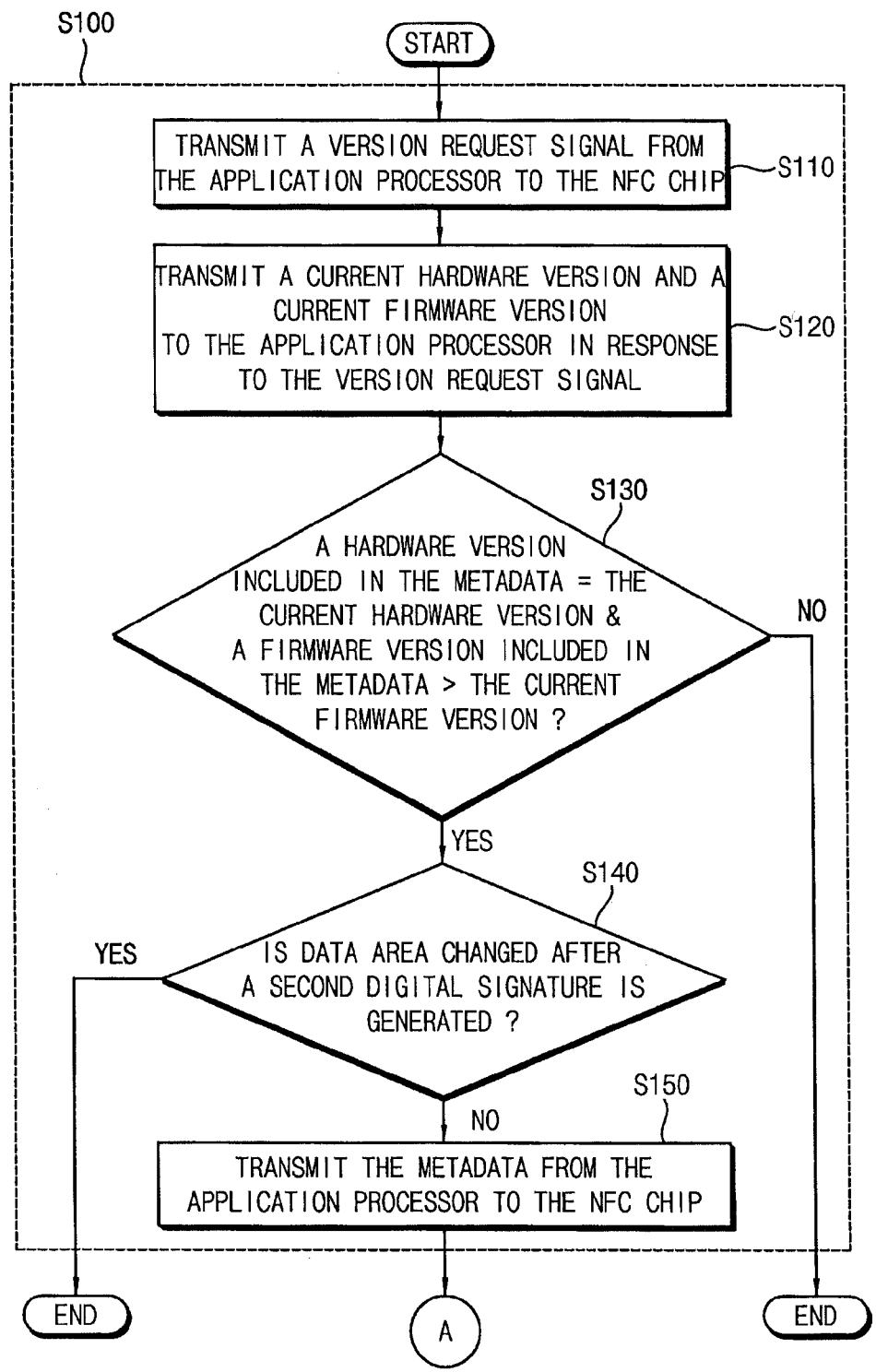
FIGS. 15A, 15B and 15C is are flow charts illustrating an example of the method of updating firmware of an NFC device of FIG. 1 wherein the firmware image file has the structure of FIG. 14.
Figure 15B:
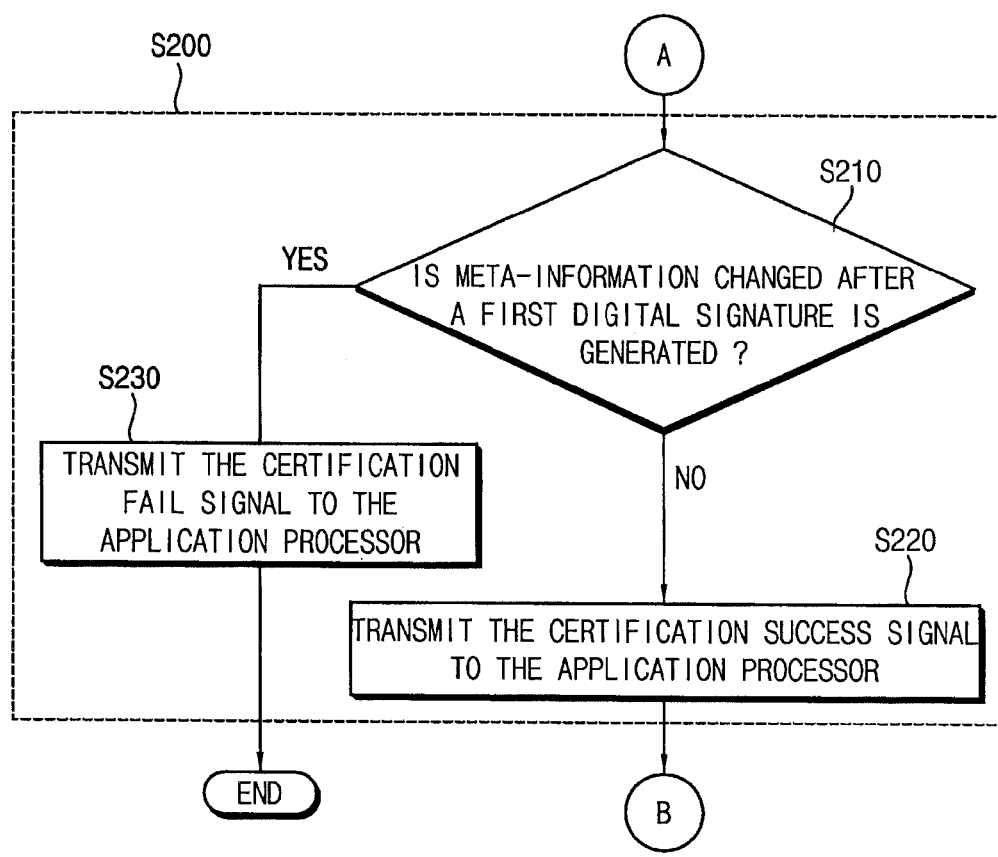
Figure 15C:
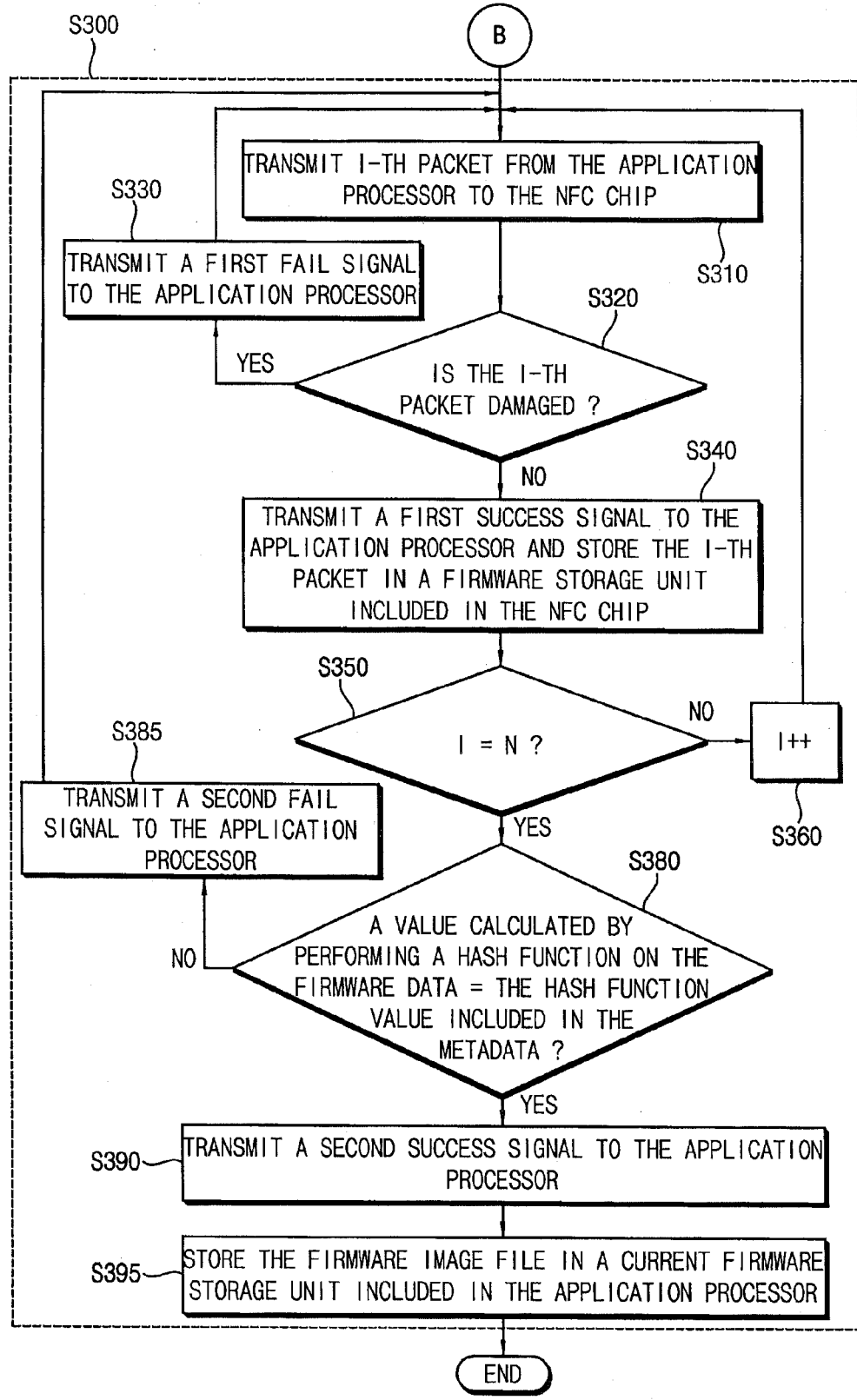

FIG. 14 is a diagram illustrating an example of the structure of the firmware image file as shown in FIG. 3. FIG. 15A, FIG. 15B and FIG. 15C are flow charts illustrating an example of the method of updating firmware of an NFC device of FIG. 1 when the firmware image file has the structure shown in FIG. 14.

Referring to FIG. 14, a firmware image file 300f may include the data area 330 and the second digital signature 340 for the data area 330.

The second digital signature 340 may be generated by applying one or more various encryption algorithms to the data area 330.

A second public key to decrypt the second digital signature 340 may be stored in the application processor 100.

The data area 330 may include the firmware data 320, which corresponds to a raw data of a firmware to drive the NFC device 200, and the metadata 310, which includes information of the firmware data 320.

The firmware data 320 may be divided into the plurality of packets 321-1, 321-2 through 321-n, where "n" represents an integer equal to or greater than two.

The metadata 310 may include the meta-information 311, which includes information of the firmware data 320, and the first digital signature 319 for the meta-information 311.

The first digital signature 319 may be generated by applying one or more various encryption algorithms to the meta-information 311.

A first public key to decrypt the first digital signature 319 may be stored in the NFC device 200.

The meta-information 311 may include the hardware version 315, which represents a version of a hardware on which a firmware corresponding to the firmware data 320 operates, and the firmware version 316, which represents a version of the firmware data 320.

The meta-information 311 may include the number 312 of the plurality of packets 321-1, 321-2 through 321-n included in the firmware data 320 and the plurality of CRC values 313 corresponding to the plurality of packets 321-1, 321-2 through 321-n, respectively.

The meta-information 311 may include the hash function value 314 of the firmware data 320.

In this case, as illustrated in FIG. 15A, FIG. 15B and FIG. 15C, the application processor 100 may transmit a version request signal to the NFC device 200 (step S110), and the NFC device 200 may transmit a current hardware version, which represents a hardware version of the NFC device 200, and a current firmware version, which represents a version of the firmware stored in the firmware storage unit 210 of the NFC device 200, to the application processor 100 in response to the version request signal (step S120).

When the hardware version 315 included in the meta-information 311 is different from the current hardware version received from the NFC device 200 or the firmware version 316 included in the meta-information 311 is equal to or lower than the current firmware version received from the NFC device 200 (e.g. branch "no" at step S130), the application processor 100 may terminate the firmware update operation.

When the hardware version 315 included in the meta-information 311 is equal to the current hardware version received from the NFC device 200 and the firmware version 316 included in the meta-information 311 is higher than the current firmware version received from the NFC device 200 (e.g. branch "yes" at step S130), the application processor 100 may determine whether the data area 330 is changed after the second digital signature 340 is generated based on the second digital signature 340 and the second public key (step S140).

When the application processor 100 determines that the data area 330 is changed after the second digital signature 340 is generated (e.g. branch "yes" at step S140), the application processor 100 may terminate the firmware update operation.

When the application processor 100 determines that the data area 330 is unchanged after the second digital signature 340 is generated (e.g. branch "no" at step S140), the application processor 100 may transmit the metadata 310, (which is included in the firmware image file 300f that is stored in the new firmware storage unit 120), to the NFC device 200 through the data line DL (step S150).

When the NFC device 200 receives the metadata 310 from the application processor 100, the NFC device 200 may determine whether the meta-information 311 is changed after the first digital signature 319 is generated based on the first digital signature 319 and the first public key (step S210).

When the NFC device 200 determines that the meta-information 311 is changed after the first digital signature 319 is generated (e.g. branch "yes" at step S210), the NFC device 200 may transmit the CFS to the application processor 100 through the data line DL (step S230). When the application processor 100 receives the CFS from the NFC device 200, the application processor 100 may terminate the firmware update operation.

Conversely, when the NFC device 200 determines that the meta-information 311 is unchanged after the first digital signature 319 is generated (e.g. branch "no" at step S210), the NFC device 200 may transmit the CSS to the application processor 100 through the data line DL (step S220).

When the application processor 100 receives the CSS from the NFC device 200, the application processor 100 may transmit a first packet 321-1 to the NFC device 200 (step S310). The NFC device 200 may determine whether the first packet 321-1 is damaged based on a CRC value corresponding to the first packet 321-1 among the plurality of CRC values 313 included in the meta-information 311 (step S320).

When the first packet 321-1 is damaged (e.g. branch "yes" at step S320), the NFC device 200 may transmit a first fail signal to the application processor 100 (step S330). When the application processor 100 receives the first fail signal from the NFC device 200, the application processor 100 may retransmit the first packet 321-1 to the NFC device 200 (step S310).

When the first packet 321-1 is undamaged (e.g. branch "no" at step S320), the NFC device 200 may transmit a first success signal to the application processor 100 and store the first packet 321-1 in the firmware storage unit 210 included in the NFC device 200 (step S340).

When the application processor 100 receives the first success signal from the NFC device 200, the application processor 100 may determine whether all of the plurality of packets 321-1, 321-2 through 321-n are transmitted to the NFC device 200 (step S350).

When all of the plurality of packets 321-1, 321-2 through 321-n are not transmitted to the NFC device 200 (e.g. branch "no" at step S350), the application processor 100 may select a next packet, which is a second packet 321-2 in this case, (step S360) and transmit the second packet 321-2 to the NFC device 200 (step S310).

The application processor 100 and the NFC device 200 may repeat the operations (steps S310, S320, S330, S340, S350 and S360) described above until all of the plurality of packets 321-1, 321-2 through 321-n included in the firmware data 320 are transmitted to the NFC device 200.

When all of the plurality of packets 321-1, 321-2 through 321-n are transmitted to the NFC device 200 such that the NFC device 200 stored all of the plurality of packets 321-1, 321-2 through 321-n included in the firmware data 320 in the firmware storage unit 210 (e.g. branch "yes" at step S350), the NFC device 200 may determine whether the firmware data 320 is damaged by comparing a value, which is calculated by performing a hash function on the firmware data 320 received from the application processor 100, with the hash function value 314 included in the meta-information 311 (step S380).

When the calculated value is different from the hash function value 314 (e.g. branch "no" at step S380), the NFC device 200 may transmit a second fail signal to the application processor 100 (step S385) since the firmware data 320 is damaged. When the application processor 100 receives the second fail signal from the NFC device 200, the application processor 100 may retransmit the plurality of packets 321-1, 321-2 through 321-n included in the firmware data 320 to the NFC device 200 (steps S310, S320, S330, S340, S350 and S360).

When the calculated value is equal to the hash function value 314 (e.g. branch "yes" at step S380), the NFC device 200 may transmit a second success signal to the application processor 100 (step S390) because the firmware data 320 is undamaged.

When the application processor 100 receives the second success signal from the NFC device 200, the application processor 100 may store the firmware image file 300f, (which is stored in the new firmware storage unit 120), in the current firmware storage unit 110 to finish the firmware update operation (step S395). Therefore, the current firmware storage unit 110 included in the application processor 100 may store the firmware image file 300f corresponding to the firmware data 320 stored in the firmware storage unit 210 included in the NFC device 200.

If the firmware data 320, (which is included in the firmware image file 300f that is stored in the new firmware storage unit 120), is damaged, the application processor 100 may repeatedly receive the first fail signal or the second fail signal from the NFC device 200. Therefore, when the application processor 100 repeatedly receives the first fail signal or the second fail signal from the NFC device 200, the application processor 100 may perform the method of updating firmware of an NFC device of FIG. 15A, FIG. 15B and FIG. 15C using a firmware image file stored in the current firmware storage unit 110 instead of the firmware image file 300f stored in the new firmware storage unit 120 to restore the firmware of the NFC device to an existing firmware.

Each step included in the method of updating firmware of an NFC device of FIG. 15A, FIG. 15B and FIG. 15C is described above with reference to FIG. 4 through FIG. 13.

Figure 16:
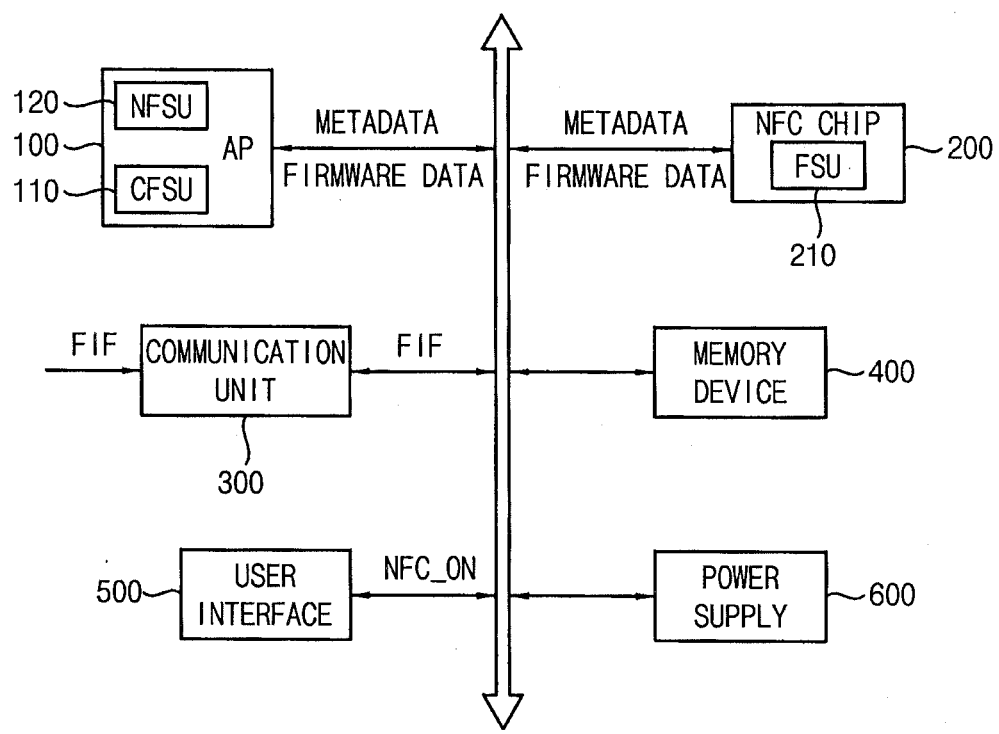
FIG. 16 is a block diagram illustrating an example of the electronic system of FIG. 2.
Figure 17:
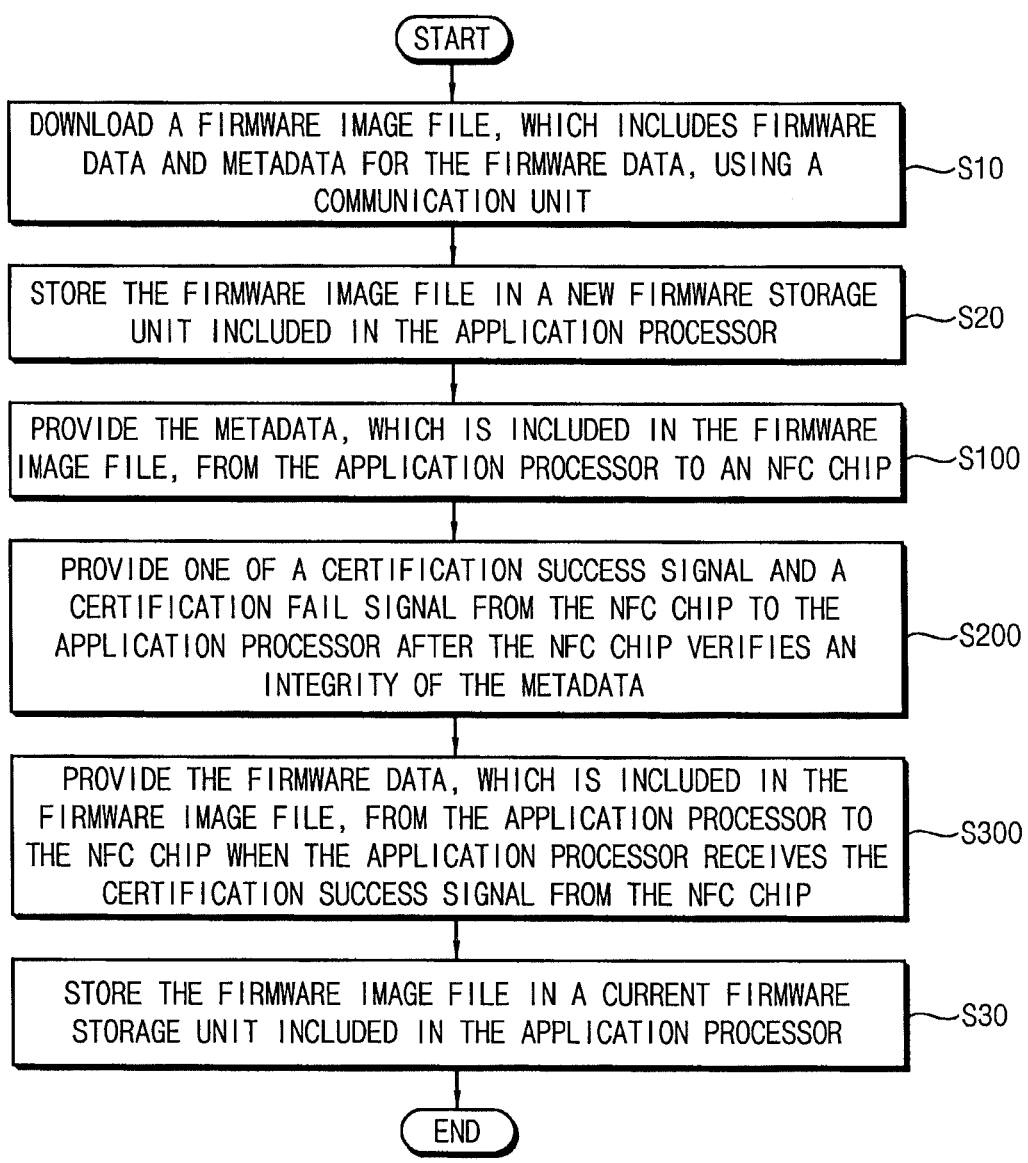
FIG. 17 is a flow chart illustrating a method of operating an electronic system including the NFC device according to an embodiment of the inventive concepts.

FIG. 16 is a block diagram illustrating an example of the electronic system shown in FIG. 2. FIG. 17 is a flow chart illustrating a method of operating an electronic system including an NFC device according to example embodiments.

The method of operating an electronic system in FIG. 17 may be performed by the electronic system of FIG. 16.

Referring to FIG. 16 and FIG. 17, an electronic system 10a includes an application processor AP 100, an NFC device 200 and a communication unit 300. The electronic system 10a may further include a memory device 400, a user interface 500 and a power supply 600.

In some embodiments, the electronic system 10a may be a mobile phone, a smart phone, a personal digital assistant (PDA), a portable multimedia player (PMP), a digital camera, a music player, a portable game console, a navigation system, or a laptop computer.

The application processor 100 controls the overall operation of the electronic system 10a. For example, the application processor 100 may execute applications, such as a web browser, a game application, or a video player. In some embodiments, the application processor 100 may include a single core or multiple cores. For example, the application processor 100 may be a multi-core processor, such as a dual-core processor, a quad-core processor or a hexa-core processor. The application processor 100 may include an internal or external cache memory.

The communication unit 300 performs wired or wireless communication with an external device. For example, the communication unit 300 may perform Ethernet communication, mobile telecommunication, memory card communication or universal serial bus (USB) communication. In some embodiments, the communication unit 300 may include a baseband chipset that supports communications, such as global system for mobile communications (GSM), general packet radio service (GPRS), wideband code division multiple access (WCDMA) or high speed downlink/uplink packet access (HSxPA).

The memory device 400 may store various data required for an operation of the electronic system 10a. For example, the memory device 400 may store a boot image for booting the electronic system 10a, output data to be transmitted to an external device and input data received from the external device. In some example embodiments, the memory device 400 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM) or a ferroelectric random access memory (FRAM).

The NFC device 200 transmits the output data stored in the memory device 400 to the external device through NFC. The NFC device 200 receives the input data from the external device through NFC to store the input data in the memory device 400.

The user interface 500 may include at least one input device, such as a keypad or a touch screen, and at least one output device, such as a speaker or a display device. The power supply 600 may supply a power supply voltage to the electronic system 10a.

In some example embodiments, the NFC device may include a firmware storage unit (FSU) 210. The firmware storage unit 210 may store a firmware for driving the NFC device 200.

The application processor 100 may include a current firmware storage unit CFSU 110 and a new firmware storage unit NFSU 120.

The firmware of the NFC device 200 may be updated using the method of FIG. 17.

The communication unit 300 may download a firmware image file (FIF), which includes firmware data and metadata for the firmware data, from an external device (step S10). In some example embodiments, the communication unit 300 may download the FIF from a server of a communication service provider through a wireless communication. In other example embodiments, the communication unit 300 may download the FIF from an external device, which is connected to the electronic system 10a via a communication cable, through a wired communication. The firmware image file FIF may be generated by a manufacturer of the NFC device 200. The communication unit 300 may provide the firmware image file FIF to the application processor 100.

The application processor 100 may store the firmware image file FIF received from the communication unit 300 in the new firmware storage unit 120 (step S20).

When a user activates an NFC function of the electronic system 10a using the user interface 500, the user interface 500 may generate an NFC on signal NFC_ON.

When the application processor 100 receives the NFC on signal NFC_ON from the user interface 500, the application processor 100 may provide the metadata, which is included in the firmware image file FIF that is stored in the new firmware storage unit 120, to the NFC device 200 (step S100). In some example embodiments, the application processor 100 may determine whether the firmware of the NFC device 200 is required to be updated with the firmware data 320 included in the FIF by performing a version check, and provide the metadata to the NFC device 200 when the application processor 100 determines that the firmware of the NFC device 200 is required to be updated with the firmware data 320.

The NFC device 200 may verify an integrity of the metadata, and then provide a CSS to the application processor 100 when the NFC device 200 determines that the metadata has an integrity, or alternatively provide a CFS to the application processor 100 when the NFC device 200 determines that the metadata does not have an integrity (step S200).

When the application processor 100 receives the CFS from the NFC device 200, the application processor 100 may terminate a firmware update operation without providing the firmware data, which is included in the FIF, to the NFC device 200. Therefore, the firmware of the NFC device 200 may not be updated.

When the application processor 100 receives the CSS from the NFC device 200, the application processor 100 may provide the firmware data, which is included in the firmware image file FIF, to the NFC device 200, and the NFC device 200 may update the firmware of the NFC device 200 with the firmware data received from the application processor 100 by storing the firmware data in the firmware storage unit 210. (step S300).

The application processor 100 may store the FIF, which is stored in the new firmware storage unit 120, in the current firmware storage unit 110 to finish the firmware update operation (step S30).

After that, the NFC device 200 may perform a normal operation to communicate with an external device.

The method of updating the firmware of the NFC device 200 is described above with reference to FIG. 1 through FIG. 15C.

In some embodiments, the electronic system 10a may further include an image processor, and/or a storage device, such as a memory card, a solid state drive (SSD), a hard disk drive (HDD) or a CD-ROM.

In some embodiments, the electronic system 10a and/or components of the electronic system 10a may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP) or wafer-level processed stack package (WSP).

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of updating firmware of a near field communication (NFC) device, the method comprising:
copying metadata, which is included in a firmware image file, from an application processor to the NFC device;
providing one of a certification success signal and a certification fail signal from the NFC device to the application processor after the NFC device verifies an integrity of the metadata; and
copying firmware data, which is included in the firmware image file, from the application processor to the NFC device when the application processor receives the certification success signal from the NFC device,
wherein the firmware image file includes a data area, which includes the metadata and the firmware data, and a first digital signature for the data area,
wherein copying the metadata from the application processor to the NFC device includes:
determining, by the application processor, whether the data area is changed after the first digital signature is generated based on the first digital signature and a public key;
transmitting the metadata from the application processor to the NFC device when the data area is unchanged after the first digital signature is generated;
wherein the firmware data is divided into a plurality of packets, and the metadata includes a plurality of cyclic redundancy check (CRC) values corresponding to the plurality of packets, respectively; and
wherein providing the firmware data from the application processor to the NFC device when the application processor receives the certification success signal from the NFC device includes:
serially transmitting the plurality of packets from the application processor to the NFC device;
upon receiving at the NFC device, one packet among the plurality of packets from the application processor, determining whether the one packet is damaged based on a CRC value corresponding to the one packet among the plurality of CRC values included in the metadata;
requesting the application processor to retransmit the one packet when the one packet is damaged; and
storing the one packet in a firmware storage unit included in the NFC device when the one packet is undamaged.

2. The method of claim 1, wherein the metadata includes meta-information for the firmware data and a second digital signature for the meta-information.

3. The method of claim 2, wherein providing one of the certification success signal and the certification fail signal from the NFC device to the application processor after the NFC device verifies the integrity of the metadata includes:
determining, by the NFC device, whether the meta-information is changed after the second digital signature is generated based on the second digital signature and a public key;
transmitting the certification success signal to the application processor when the meta-infotination is unchanged after the second digital signature is generated; and
transmitting the certification fail signal to the application processor when the meta-information is changed after the second digital signature is generated.

4. The method of claim 1, wherein the metadata includes a hash function value of the firmware data.

5. The method of claim 4, wherein providing the firmware data from the application processor to the NFC device when the application processor receives the certification success signal from the NFC device includes:
   transmitting the firmware data from the application processor to the NFC device;
   comparing, by the NFC device, a value, which is calculated by performing a hash function on the firmware data, with the hash function value included in the metadata;
   transmitting a fail signal to the application processor when the calculated value is different from the hash function value; and
   transmitting a success signal to the application processor when the calculated value is equal to the hash function value.

6. The method of claim 5, wherein providing the firmware data from the application processor to the NFC device when the application processor receives the certification success signal from the NFC device further includes:
   retransmitting the firmware data from the application processor to the NFC device when the application processor receives the fail signal from the NFC device; and
   storing the firmware image file in a current firmware storage unit included in the application processor when the application processor receives the success signal from the NFC device.

7. The method of claim 1, wherein the metadata includes a hardware version, which represents a version of a hardware on which a firmware corresponding to the firmware data operates, and a firmware version, which represents a version of the firmware data.

8. The method of claim 7, wherein providing the metadata from the application processor to the NFC device includes:
   transmitting a version request signal from the application processor to the NFC device;
   transmitting a current hardware version and a current firmware version from the NFC device to the application processor in response to the version request signal; and
   transmitting the metadata from the application processor to the NFC device when the hardware version included in the metadata is equal to the current hardware version received from the NFC device, and the firmware version included in the metadata is higher than the current firmware version received from the NFC device.

9. The method of claim 1, wherein the metadata includes meta-information for the firmware data and a second digital signature for the meta-information, and the meta-information includes a hash function value for the firmware data.

10. The method of claim 9, wherein providing one of the certification success signal and the certification fail signal from the NFC device to the application processor after the NFC device verifies the integrity of the metadata includes:
   determining, by the NFC device, whether the meta-information is changed after the second digital signature is generated based on the second digital signature and a public key;
   transmitting the certification success signal to the application processor when the meta-information is unchanged after the second digital signature is generated; and
   transmitting the certification fail signal to the application processor when the meta-information is changed after the second digital signature is generated, and wherein providing the firmware data from the application processor to the NFC device when the application processor receives the certification success signal from the NFC device includes:
   transmitting the firmware data from the application processor to the NFC device;
   comparing, by the NFC device, a calculated value, which is generated by performing a hash function on the firmware data, with the hash function value included in the meta-information;
   transmitting a fail signal to the application processor when the calculated value is different from the hash function value; and
   transmitting a success signal to the application processor when the calculated value is equal to the hash function value.

11. A method of operating an electronic system including an application processor, a near field communication (NFC) device and a communication unit, the method comprising:
   downloading a firmware image file, which includes firmware data and metadata for the firmware data, using the communication unit;
   storing the firmware image file in a new firmware storage unit included in the application processor;
   copying the metadata from the application processor to the NFC device;
   providing one of a certification success signal and a certification fail signal from the NFC device to the application processor after the NFC device verifies an integrity of the metadata;
   copying the firmware data from the application processor to the NFC device when the application processor receives the certification success signal from the NFC device; and
   storing the firmware image file in a current firmware storage unit included in the application processor,
   wherein the firmware image file includes a data area, which includes the metadata and the firmware data, and a first digital signature for the data area,
   wherein copying the metadata from the application processor to the NFC device includes:
   determining, by the application processor, whether the data area is changed after the first digital signature is generated based on the first digital signature and a public key;
   transmitting the metadata from the application processor to the NFC device when the data area is unchanged after the first digital signature is generated
   wherein the firmware data is divided into a plurality of packets, and the metadata includes a plurality of cyclic redundancy check (CRC) values corresponding to the plurality of packets, respectively; and
   wherein providing the firmware data from the application processor to the NFC device when the application processor receives the certification success signal from the NFC device includes:
   serially transmitting the plurality of packets from the application processor to the NFC device;
   upon receiving at the NFC device, one packet among the plurality of packets from the application processor, determining whether the one packet is damaged based on a CRC value corresponding to the one packet among the plurality of CRC values included in the metadata;
   requesting the application processor to retransmit the one packet when the one packet is damaged; and
   storing the one packet in a firmware storage unit included in the NFC device when the one packet is undamaged.

12. A near field communication (NFC) system comprising:
- an application processor (AP), including a new firmware storage unit (NFSU) and a current firmware storage unit (CFSU), the AP configured to receive a firmware image file (FIF) into the NFSU, the FIF comprising a meta-data and a firmware-data, the AP configured to copy the FIF from the NFSU to the CFSU upon validation of an attribute of the meta-data; and
- an NFC device in electrical communication with the AP, the NFC device configured to receive the meta-data from the AP, to determine the validation of the attribute of the meta-data, and to transmit a signal to the AP to indicate if a validation of the meta-data has occurred,
- wherein the FIF includes a data area, which includes the meta-data and the firmware-data, and a first digital signature for the data area,
- wherein the AP is configured to copy the meta-data from the AP to the NFC device by the AP being configured to determine, whether the data area is changed after the first digital signature is generated based on the first digital signature and a public key and the AP being configured to transmit the meta-data from the AP to the NFC device when the data area is unchanged after the first digital signature is generated;
- wherein the firmware-data is divided into a plurality of packets, and the meta-data includes a plurality of cyclic redundancy check (CRC) values corresponding to the plurality of packets, respectively; and
- wherein providing the firmware-data from the application processor to the NFC device when the application processor receives the certification success signal from the NFC device includes:
- serially transmitting the plurality of packets from the application processor to the NFC device;
- upon receiving at the NFC device, one packet among the plurality of packets from the application processor, determining whether the one packet is damaged based on a CRC value corresponding to the one packet among the plurality of CRC values included in the meta-data;
- requesting the application processor to retransmit the one packet when the one packet is damaged; and
- storing the one packet in a firmware storage unit included in the NFC device when the one packet is undamaged.

13. The system of claim 12 wherein the AP is configured to transmit the firmware-data to the NFC device upon validation of an attribute of the meta-data.

14. The system of claim 13 wherein the AP is configured to transmit the firmware-data to the NFC device as a series of packets.

15. The system of claim 12 wherein the meta-data includes a second digital signature used to validate the attribute of the meta-data.

16. The system of claim 12 wherein the meta-data includes a hash function value used to validate the attribute of the meta-data.

* * * * *